United States Patent
Gajjala et al.

(10) Patent No.: US 12,416,974 B2
(45) Date of Patent: Sep. 16, 2025

(54) AUDIO-VIDEO-HAPTICS RECORDING AND PLAYBACK

(71) Applicant: QUALCOMM Incorporated, San Diego, CA (US)

(72) Inventors: Durga Prasad Reddy Gajjala, Hyderabad (IN); Maulik Khimjibhai Patel, Hyderabad (IN); Nitin Srivastava, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/570,185

(22) Filed: Jan. 6, 2022

(65) Prior Publication Data

US 2023/0214020 A1    Jul. 6, 2023

(51) Int. Cl.
| | |
|---|---|
| G06F 3/01 | (2006.01) |
| G06V 10/46 | (2022.01) |
| G06V 20/40 | (2022.01) |
| H04N 21/41 | (2011.01) |
| H04N 21/44 | (2011.01) |

(52) U.S. Cl.
CPC ............ *G06F 3/016* (2013.01); *G06V 10/462* (2022.01); *G06V 20/44* (2022.01); *G06V 20/46* (2022.01); *H04N 21/4104* (2013.01); *H04N 21/44008* (2013.01)

(58) Field of Classification Search
None
See application file for complete search history.

(56) References Cited

U.S. PATENT DOCUMENTS

| | | | |
|---|---|---|---|
| 10,089,785 B2 | 10/2018 | Demirli et al. | |
| 2009/0096632 A1* | 4/2009 | Ullrich | H04N 21/81 |
| | | | 340/407.1 |
| 2009/0128306 A1* | 5/2009 | Luden | H04N 21/43074 |
| | | | 340/407.1 |
| 2015/0054727 A1 | 2/2015 | Saboune et al. | |
| 2015/0109528 A1 | 4/2015 | Choi et al. | |
| 2015/0189223 A1 | 7/2015 | Levesque et al. | |
| 2016/0104356 A1* | 4/2016 | Cruz-Hernandez | G06F 3/016 |
| | | | 340/407.1 |

(Continued)

FOREIGN PATENT DOCUMENTS

| | | |
|---|---|---|
| EP | 3125076 A1 | 2/2017 |
| EP | 3179336 A1 | 6/2017 |
| EP | 3035161 B1 | 9/2019 |

OTHER PUBLICATIONS

Danieau F., et al., "Enhancing Audiovisual Experience with Haptic Feedback: A Survey on HAV", IEEE Transactions on Haptics, vol. 6, No. 2, Apr. 1, 2013, pp. 193-205, XP055531823, USA, ISSN: 1939-1412, DOI: 10.1109/TOH.2012.70, abstract, sections 2, 3, 3.1, 3.3, 3.3.1, 3.3.2, 5.1, 7, figure 1.

(Continued)

*Primary Examiner* — Heather R Jones
(74) *Attorney, Agent, or Firm* — QUALCOMM Incorporated

(57) ABSTRACT

Innovative techniques to generate a haptic stream are proposed. The proposed techniques allow haptic stream to be captured and along with audio/video stream. In so doing, a full experience—audio, video, haptics experience—may be experienced during playback.

20 Claims, 15 Drawing Sheets

(56) References Cited

U.S. PATENT DOCUMENTS

| | | | |
|---|---|---|---|
| 2018/0027520 A1* | 1/2018 | Levesque | H04W 68/005 |
| | | | 455/412.2 |
| 2018/0164887 A1 | 6/2018 | Wu et al. | |
| 2018/0232051 A1 | 8/2018 | Wu et al. | |
| 2019/0041989 A1* | 2/2019 | Wu | G06T 7/90 |
| 2020/0012347 A1* | 1/2020 | Wu | G08B 6/00 |

OTHER PUBLICATIONS

International Search Report and Written Opinion—PCT/US2022/078979—ISA/EPO—Feb. 13, 2023.

\* cited by examiner

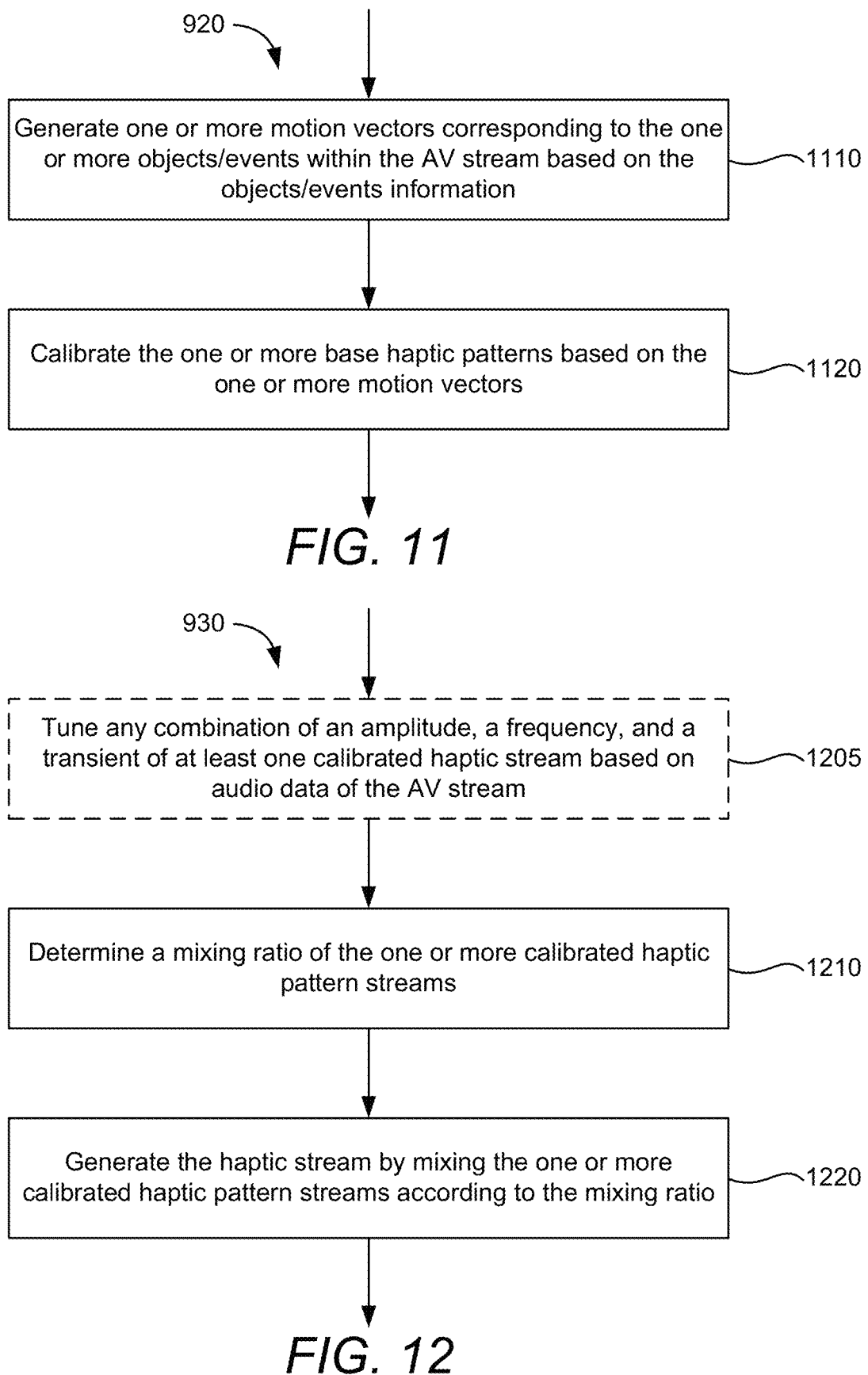

AUDIO-VIDEO-HAPTICS RECORDING AND PLAYBACK

FIELD OF DISCLOSURE

This disclosure relates generally to recording and playback of audio, video and haptics.

BACKGROUND

Haptic (vibration pattern) experience on platforms—e.g., mobile devices such as smart phones—is being enhanced day by day. In a perspective, haptics may be viewed as stimulation of the senses of touch and motion, e.g., by reproducing sensations when interacting with physical objects.

While haptics experience is being enhanced, there is still not yet any feature/use case which records or captures haptic stream along with audio and video stream to enable a full experience, e.g., while watching a video stream captured by a mobile camera. Currently, devices with cameras such as mobile phones only capture audio and video data. Adding haptic stream along with audio and video stream can be a game changer in providing overall enhanced end user experience.

Accordingly, there is a need for systems, apparatus, and methods that overcome the deficiencies of conventional devices for recording and capturing haptics including the methods, system and apparatus provided herein.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

An exemplary haptic recording device is disclosed. The haptic recording device may comprise an objects/events identifier configured to generate objects/events information from one or more objects/events within an audio/video (AV) stream. The objects/events information may comprise one or more object/event types corresponding to the one or more objects/events. The haptic recording device may also comprise a haptic generator configured to generate a haptic stream based on the one or more object/event types in the objects/events information. The haptic recording device may further comprise an encoder configured to encode the AV stream with the haptic stream as a coordinated audio/video/haptic (AVH) stream.

A method of recording haptics is disclosed. The method may comprise generating objects/events information from one or more objects/events within an audio/video (AV) stream. The objects/events information may comprise one or more object/event types corresponding to the one or more objects/events. The method may also comprise generating a haptic stream based on the one or more object/event types in the objects/events information. The method may further comprise encoding (530) the AV stream with the haptic stream as a coordinated audio/video/haptic (AVH) stream.

An exemplary haptic recording device is disclosed. The haptic recording device may comprise means for generating objects/events information from one or more objects/events within an audio/video (AV) stream. The objects/events information may comprise one or more object/event types corresponding to the one or more objects/events. The haptic recording device may also comprise means for generating a haptic stream based on the one or more object/event types in the objects/events information. The haptic recording device may further comprise means for encoding (530) the AV stream with the haptic stream as a coordinated audio/video/haptic (AVH) stream.

A non-transitory computer-readable medium storing computer-executable instructions for a haptic recording device configured to record haptics is disclosed. The computer-executable instructions may comprise one or more instructions instructing the haptic recording device to generate objects/events information from one or more objects/events within an audio/video (AV) stream. The objects/events information may comprise one or more object/event types corresponding to the one or more objects/events. The computer-executable instructions may also comprise one or more instructions instructing the haptic recording device to generate a haptic stream based on the one or more object/event types in the objects/events information. The computer-executable instructions may further comprise one or more instructions instructing the haptic recording device to encode the AV stream with the haptic stream as a coordinated audio/video/haptic (AVH) stream.

An exemplary haptic playback device is disclosed. The haptic playback device may comprise a file content detector configured to determine whether a haptic stream corresponding to an audio/video (AV) stream for playback is available. The haptic stream may be determined to be available when the AV stream is from an audio/video/haptic (AVH) file or is an AV file associated with a haptic (H) file. The haptic playback device may also comprise a user contact detector configured to determine whether a user is in physical contact with the haptic playback device. The haptic playback device may further comprise a playback renderer configured to render the haptic stream with the AV stream for playback when the file content detector determines that the haptic stream is available and when the user contact detector determines that the user is in physical contact with the haptic playback device.

A method of haptic playback is disclosed. The method may comprise determining whether a haptic stream corresponding to an audio/video (AV) stream for playback is available. The haptic stream may be determined to be available when the AV stream is from an audio/video/haptic (AVH) file or is an AV file associated with a haptic (H) file. The method may also comprise determining whether a user is in physical contact with a haptic playback device. The method may further comprise rendering the haptic stream with the AV stream for playback when it is determined that the haptic stream corresponding to the AV stream for playback is available and when it is determined that the user is in physical contact with the haptic playback device.

An exemplary haptic playback device is disclosed. The haptic playback device may comprise means for determining whether a haptic stream corresponding to an audio/video (AV) stream for playback is available. The haptic stream may be determined to be available when the AV stream is from an audio/video/haptic (AVH) file or is an AV file associated with a haptic (H) file. The haptic playback device may also comprise means for determining whether a user is in physical contact with the haptic playback device. The haptic playback device may further comprise means for rendering the haptic stream with the AV stream for playback when it is determined that the haptic stream corresponding to the AV stream for playback is available and when it is determined that the user is in physical contact with the haptic playback device.

A non-transitory computer-readable medium storing computer-executable instructions for a haptic playback device configured to playback haptics is disclosed. The computer-executable instructions may comprise one or more instructions instructing the haptic playback device to determine whether a haptic stream corresponding to an audio/video (AV) stream for playback is available. The haptic stream may be determined to be available when the AV stream is from an audio/video/haptic (AVH) file or is an AV file associated with a haptic (H) file. The computer-executable instructions may also comprise one or more instructions instructing the haptic playback device to determine whether a user is in physical contact with the haptic playback device. The computer-executable instructions may further comprise one or more instructions instructing the haptic playback device to render the haptic stream with the AV stream for playback when it is determined that the haptic stream corresponding to the AV stream for playback is available and when it is determined that the user is in physical contact with the haptic playback device.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

FIGS. 6-12 illustrate flow charts of an example method of recording haptics in accordance with at one or more aspects of the disclosure.

Figure 1:
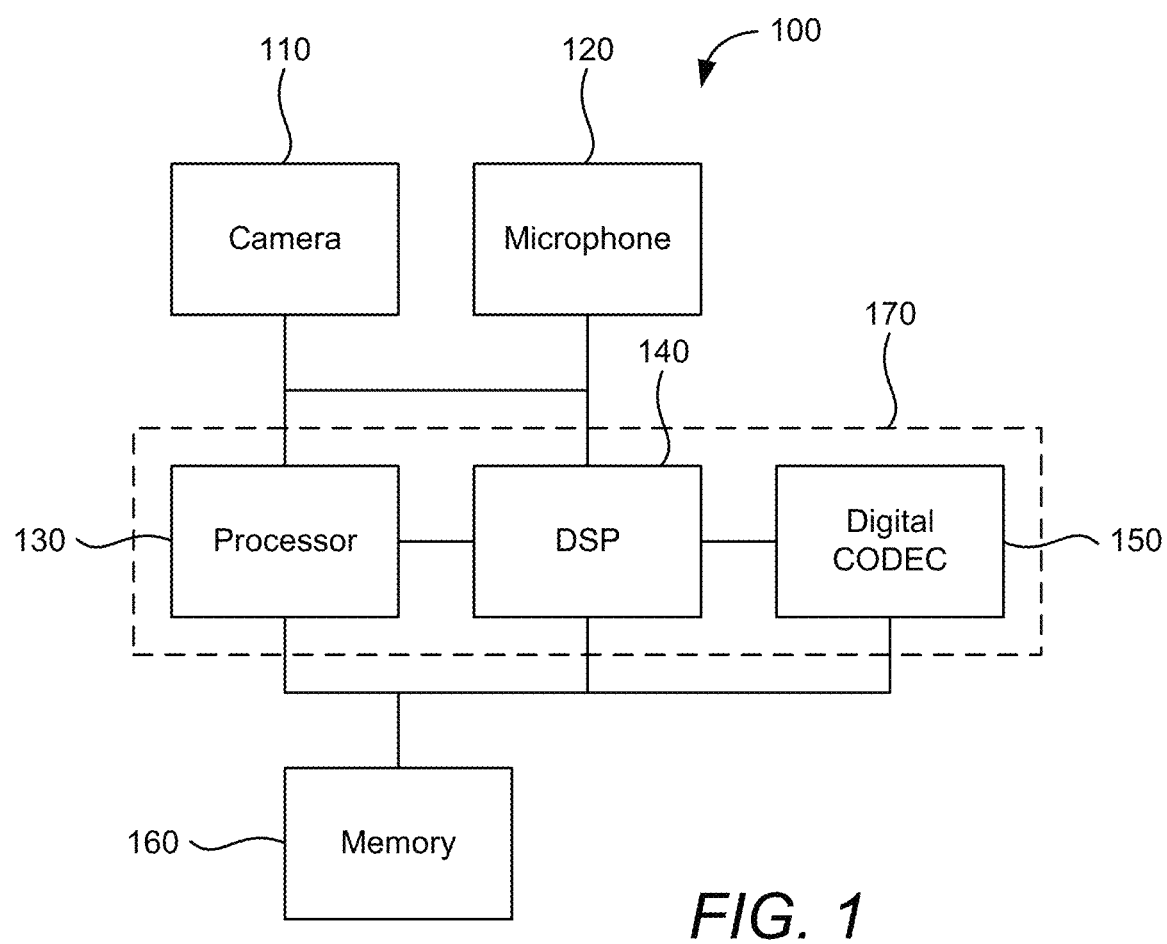
FIG. 1 illustrates an example architecture of a device configured to record haptics in accordance with at one or more aspects of the disclosure.

Other objects and advantages associated with the aspects disclosed herein will be apparent to those skilled in the art based on the accompanying drawings and detailed description. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the present disclosure are illustrated in the following description and related drawings directed to specific embodiments. Alternate aspects or embodiments may be devised without departing from the scope of the teachings herein. Additionally, well-known elements of the illustrative embodiments herein may not be described in detail or may be omitted so as not to obscure the relevant details of the teachings in the present disclosure.

In certain described example implementations, instances are identified where various component structures and portions of operations can be taken from known, conventional techniques, and then arranged in accordance with one or more exemplary embodiments. In such instances, internal details of the known, conventional component structures and/or portions of operations may be omitted to help avoid potential obfuscation of the concepts illustrated in the illustrative embodiments disclosed herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

As indicated above, there is still not yet any feature slash use cases that records or captures haptic stream along with audio and video stream to enable a full experience during playback. This is because currently, camera recorders (camcorders), such as on mobile devices, only capture audio and video (A/V) data streams. Being able to add haptic stream along with the audio and video stream can be a real game changer in providing overall enhanced end user experience.

Thus, it is proposed to provide a special mode in a camera application (e.g., in smart phones) to capture A/V data along with haptic data. That is, a triple stream data (audio+video+haptic) may be captured and recorded. The triple stream data may be recorded in a single file (e.g., in an AVH file). Alternatively, the triple stream data may be captured in associated files.

In an aspect, an algorithm/application/module—implemented in hardware (HW) or in a combination of hardware and software (SW)—may utilize the A/V stream to generate a corresponding haptic stream. The haptic stream may be generated live (e.g., live capture solution) while the A/V stream is being captured. Alternatively, haptic stream can be generated after the A/V stream has been captured (e.g., offline post-processing solution). The corresponding haptic stream may be embedded with the A/V stream in a single AVH file (e.g., the triple stream captured in a single file). Alternatively, the A/V stream file may be associated with the haptic stream file.

FIG. 1 illustrates an example architecture of a device 100 configured to record haptics in accordance with at one or more aspects of the disclosure. The device 100 may be a mobile device, such as a smart phone. As seen, the device 100 may include a camera 110, a microphone 120, a processor 130, a digital signal processor (DSP) 140, a digital coder-decoder (CODEC) 150, and a memory 160. Each of the camera 110, the microphone 120, the processor 130, the DSP 140, and the digital CODEC 150 may be implemented as hardware or as a combination of hardware and software (e.g., stored in memory 160).

FIG. 1 as shown illustrates one example architecture in which the processor 130, the DSP 140 and the digital CODEC 150 may be integrated into one integrated circuit 170. An alternative architecture (not shown) may be one in which the DSP 140, the digital CODEC 150 and the memory 160 (which may be an embedded memory) are integrated into one integrated circuit, while the processor 130 may be separate and may interface with the memory 160.

Figure 2A:
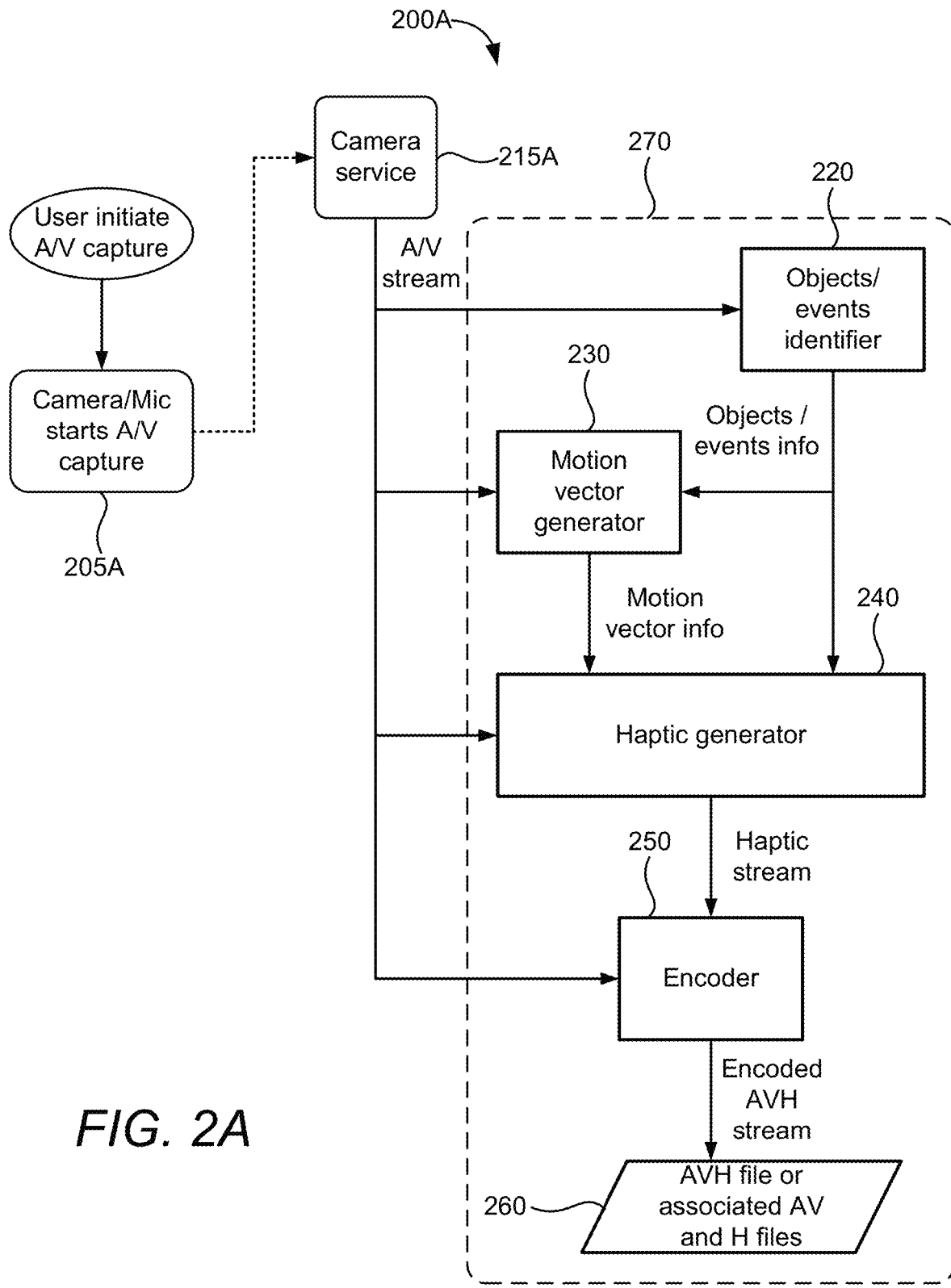
FIG. 2A illustrates an example of a system for recording haptics through live capture processing in accordance with one or more aspects of the disclosure.

FIG. 2A illustrates an example of a system 200A for recording haptics through live capture processing in accordance with one or more aspects of the disclosure. In other words, the system 200A may be configured to capture a haptic (H) stream while the corresponding AV stream is also being captured. The device 100 of FIG. 1 may be an example of the system 200A. Camera and microphone (e.g., camera 110, microphone 120) of the system 200A may capture audio and video data when a user initiates the AV capturing process. A camera service 215A of the system 200A may provide the AV stream to a haptic recording device 270 to record the haptic stream corresponding to the AV stream.

The haptic recording device 270 may analyze the video stream (of the AV stream) to parse out objects and/or events present within the video stream, e.g., present within the video frames of the video stream. The haptic recording device 270 may also utilize the audio stream (of the AV stream) along with the parsed objects/events to generate haptic content (e.g., haptic stream). The generated haptic content may be embedded or saved within a recorded file (e.g., AVH file) 260 or saved as associated files (e.g., AV file and associated H file) 260.

The haptic recording device 270 may comprise an objects/events identifier 220, a motion vector generator 230, a haptic generator 240 and an encoder 250. In general, the flow may be as follows:

(A) The user may initiate AV recording in a device (e.g., mobile phone).

(B) The camera and microphone hardware may start capturing the AV data.

(C) The objects/events identifier 220 may detect or otherwise identify objects and/or events in the live AV stream.
  Video frames (within the AV stream from the camera service 215A) may be received as input. In an aspect, the received video frames may be unprocessed raw camera frames.
  Video frames may be processed to extract features. If necessary, the camera frames may be downscaled for feature extraction.
  Extracted features may be processed to detect objects/events in the frames.
  Detection may be based on salience output. There may be multiple objects and/or events detected. In an aspect, a subset of detected objects/events may be selected for haptic generation.
  Objects/events information may be outputted.

(D) The haptic generator 240 may generate haptic stream corresponding to the AV stream.
  Objects/events information (from the objects/events identifier 220), motion vector information (from the motion vector generator 230), and audio stream (within the AV stream from the camera service 215A) may be received as inputs.
  Objects/events information may be used to generate base haptic patterns. For example, based on the objects/events information, one or more base haptic patterns may be selected or chosen from a database.
  The motion vector information and/or the audio stream data may be used to modulate (e.g., determine intensity) the base haptic patterns and determine how the modulated haptic patterns should be mixed.

(E) The encoder 250 may encode the AV and H streams as a single AVH stream. The encoded stream may be saved as a single AVH file or as associated AV and H files.

Figure 2B:
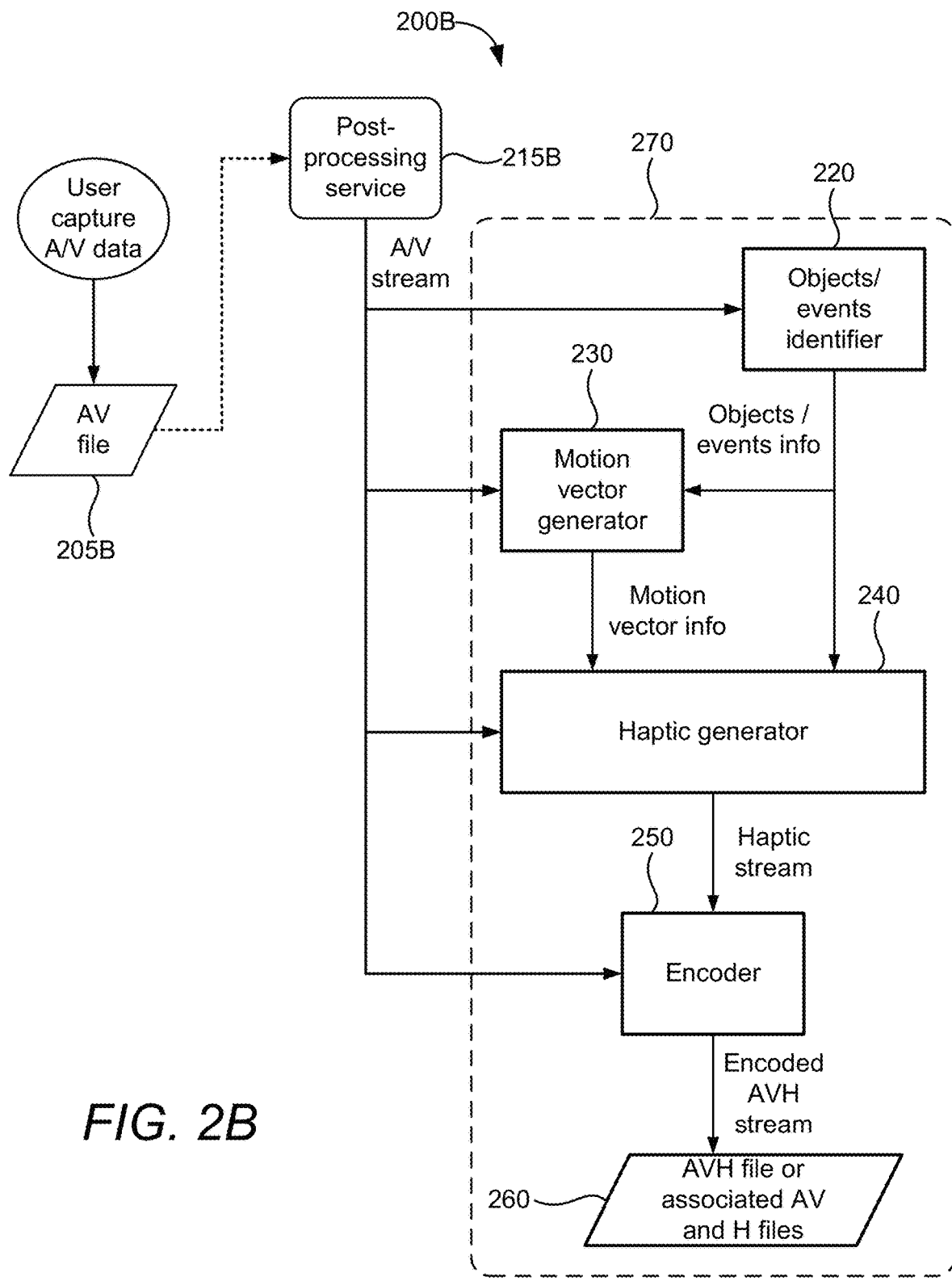
FIG. 2B illustrates an example of a system for recording haptics through off-line post processing in accordance with one or more aspects of the disclosure.

FIG. 2B illustrates an example of a system 200B for recording haptics through off-line post processing in accordance with one or more aspects of the disclosure. In other words, the system 200B may be configured to capture a haptic (H) stream from a recorded AV file. The device 100 of FIG. 1 may be an example of the system 200B. A post processing service 215B of the system 200B may provide the AV stream to a haptic recording device 270 to record the haptic stream corresponding to the AV stream.

The haptic recording device 270 of the system 200B may perform similarly to the haptic recording device 270 of the system 200A. In other words, the haptic recording device 270 may analyze the video stream (of the AV stream) to parse out objects and/or events present within the video stream. The haptic recording device 270 may also utilize the audio stream along with the parsed objects/events to generate haptic content (e.g., haptic stream). The generated haptic content may be embedded or saved within a recorded file (e.g., AVH file) or saved as associated files (e.g., AV file and associated H file).

Other than the source of the AV stream, the haptic recording devices 270 of systems 200A and 200B be same or similar. That is, the haptic recording device 270 of system 200B may also comprise an objects/events identifier 220, a motion vector generator 230, a haptic generator 240 and an encoder 250. In general, the flow of the system 200B may be as follows:

(A) The user may complete AV recording in a device (e.g., mobile phone).

(B) The post processing service 215B start post processing the captured AV file.

(C) The objects/events identifier 220 may detect or otherwise identify objects and/or events in the live AV stream.

Video frames (within the AV stream from the post processing service 215B) may be received as input. In an aspect, the received video frames may be unprocessed raw camera frames.

Video frames may be processed to extract features. If necessary, the camera frames may be downscaled for feature extraction.

Extracted features may be processed to detect objects/events in the frames.

Detection may be based on salience output. There may be multiple objects and/or events detected. In an aspect, a subset of detected objects/events may be selected for haptic generation.

Objects/events information may be outputted.

(D) The haptic generator 240 may generate haptic stream corresponding to the AV stream.

Objects/events information (from the objects/events identifier 220), motion vector information (from the motion vector generator 230), and audio stream (within the AV stream from the post processing service 215B) may be received as inputs.

Objects/events information may be used to generate base haptic patterns. For example, based on the objects/events information, one or more base haptic patterns may be selected or chosen from a database.

The motion vector information and/or the audio stream data may be used to modulate (e.g., determine intensity) the base haptic patterns and determine how the modulated haptic patterns should be mixed.

(E) The encoder 250 may encode the AV and H streams as a single AVH stream. The encoded stream may be saved as a single AVH file or as associated AV and H files.

In an aspect, the objects/events identifier 220 may be configured to generate objects/events information from one or more objects/events within the AV stream provided from the camera service 215A or from the post processing service 215B. The objects/events identifier 220 may be implemented in hardware or in a combination of hardware and software. For example, the objects/events identifier 220 may be implemented in a dedicated hardware or as an application or a process whose instructions are stored in the memory 160 and executed by the processor 130 and/or the DSP 140.

Figure 3:
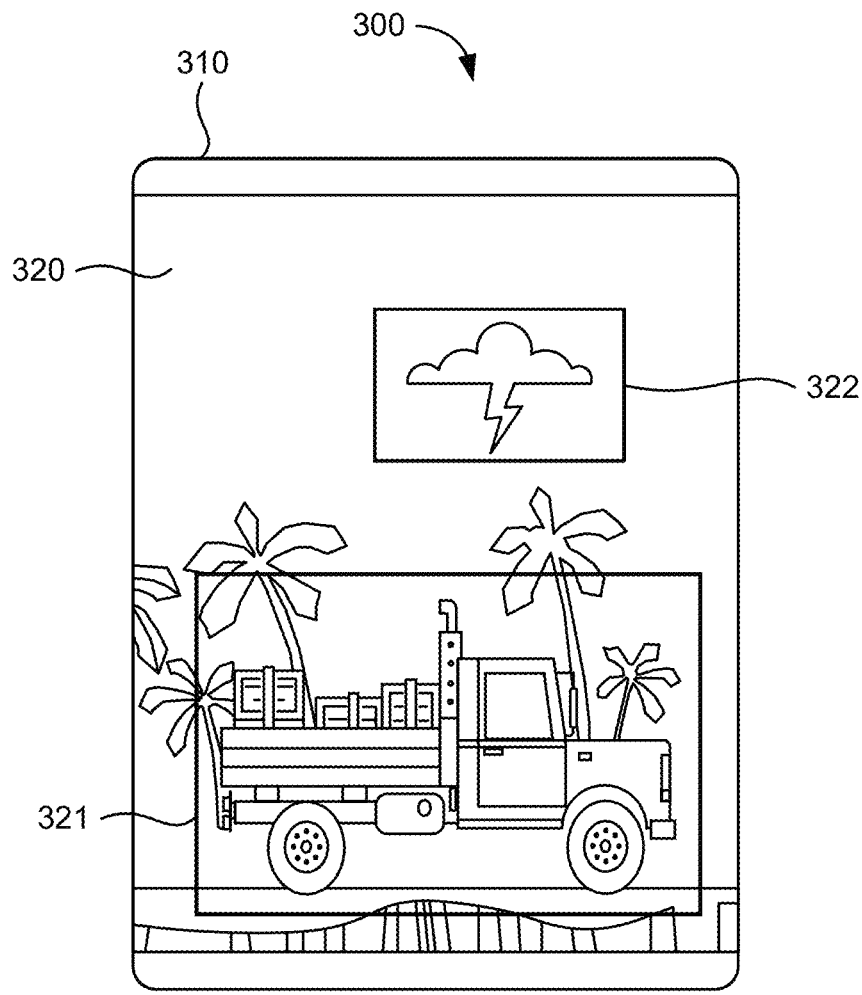
FIG. 3 illustrates an example of a video frame in which haptics is recorded in accordance with one or more aspects of the disclosure.

Objects and events are demonstrated with respect to FIG. 3 illustrating a camera recording device 300, also referred to as a camcorder device 300. The camcorder device 300 may include a display 310 on which a video frame 320 may be displayed. Within the frame 320, there may be one or more objects/events. For example, there may be a first object/event 321 (e.g., truck running on a rough road) and a second object event 322 (e.g., thunder and lightning).

In an aspect, the objects/events information may comprise one or more object/event types corresponding to the one or more objects/events. For example, the objects/events information may indicate that object/event type corresponding to the first object/event 321 may be a "truck type". As another example, the objects/events information may indicate that object/event type corresponding to the second object/event 322 may be a "lightning type". In an aspect, different objects/events may be given different priorities when generating the haptic stream. For example, automatic weight decisions may be made for the objects/events, e.g., based on their objects/event types.

Figure 4:
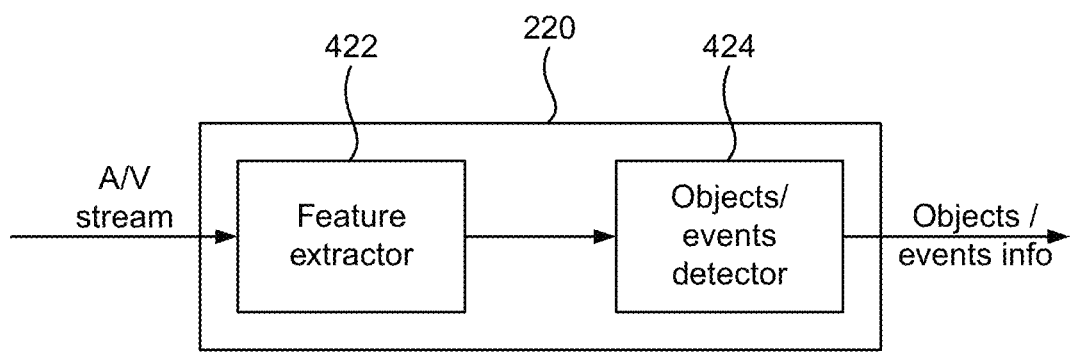
FIG. 4 illustrates an example implementation of an objects/events identifier in accordance with one or more aspects of the disclosure.

FIG. 4 illustrates an example implementation of the objects/events identifier 220 in accordance with one or more aspects of the disclosure. The objects/events identifier 220 may comprise a feature extractor 422 and an objects/events detector 424. The feature extractor 422 and/or the objects/events detector 424 may be implemented in hardware or in a combination of hardware and software (e.g., as application/process executed by the processor 130 and/or the DSP 140).

The feature extractor 422 may be configured to extract one or more features from one or more video frames of the AV stream. That is, different objects/events may be identified within the AV stream. If desired, the feature extractor 422 may downscale the video frames so that the feature extraction processing is more manageable.

The objects/events detector 424 may be configured to detect or otherwise determine the one or more objects/events from the one or more features extracted by the feature extractor 422. In an aspect, the objects/events may be detected as follows. The objects/events detector 424 may determine one or more salience values of the one or more features. A salience value of a feature may be based on characteristics of the feature such as size, frequency, distance, audio intensity, etc. or any combination of such characteristics. Salience may be viewed as identifying the dominant objects/events. For example, lower frequency objects/events may be better suited for haptic stream generation. In some instances, salience values may be determined based, at least in part, on user preferences.

The objects/events detector 424 may then choose the objects/events based on the salience values. This implies that there may be a selection process in which objects/events of "more noticeable" features (e.g., according to the salience values) are included in the objects/events information and those of "less noticeable" features are not included. For example, some number of most noticeable features may be included. As another example, a threshold salience value may be applied to prune the included and not included objects/events.

Referring back to FIGS. 2A, 2B, the motion vector generator 230 may be configured to generate motion vector information based on the objects/events information (from the objects/events identifier 220) and on the AV stream (from the camera service 215A or the post processing service 215B). The motion vector generator 230 may be implemented in hardware or in a combination of hardware and software. The motion vector information may indicate motion of the one or more objects/events (e.g., direction, speed, etc.). For example, for the first object/event type, the motion vector information may indicate that the truck is moving from left to right in the display 310. Note that the motion vector information may also be used to predict relative speed of the objects based on the frame data analysis.

The haptic generator 240 may be configured to generate a haptic stream based on the objects/events information (from the object/events identifier 220), the motion vector information (from the motion vector generator 230), and the AV stream (from the camera service 215A or the post processing service 215B). The haptic generator 240 may be implemented in hardware or in a combination of hardware and software.

Figure 5:
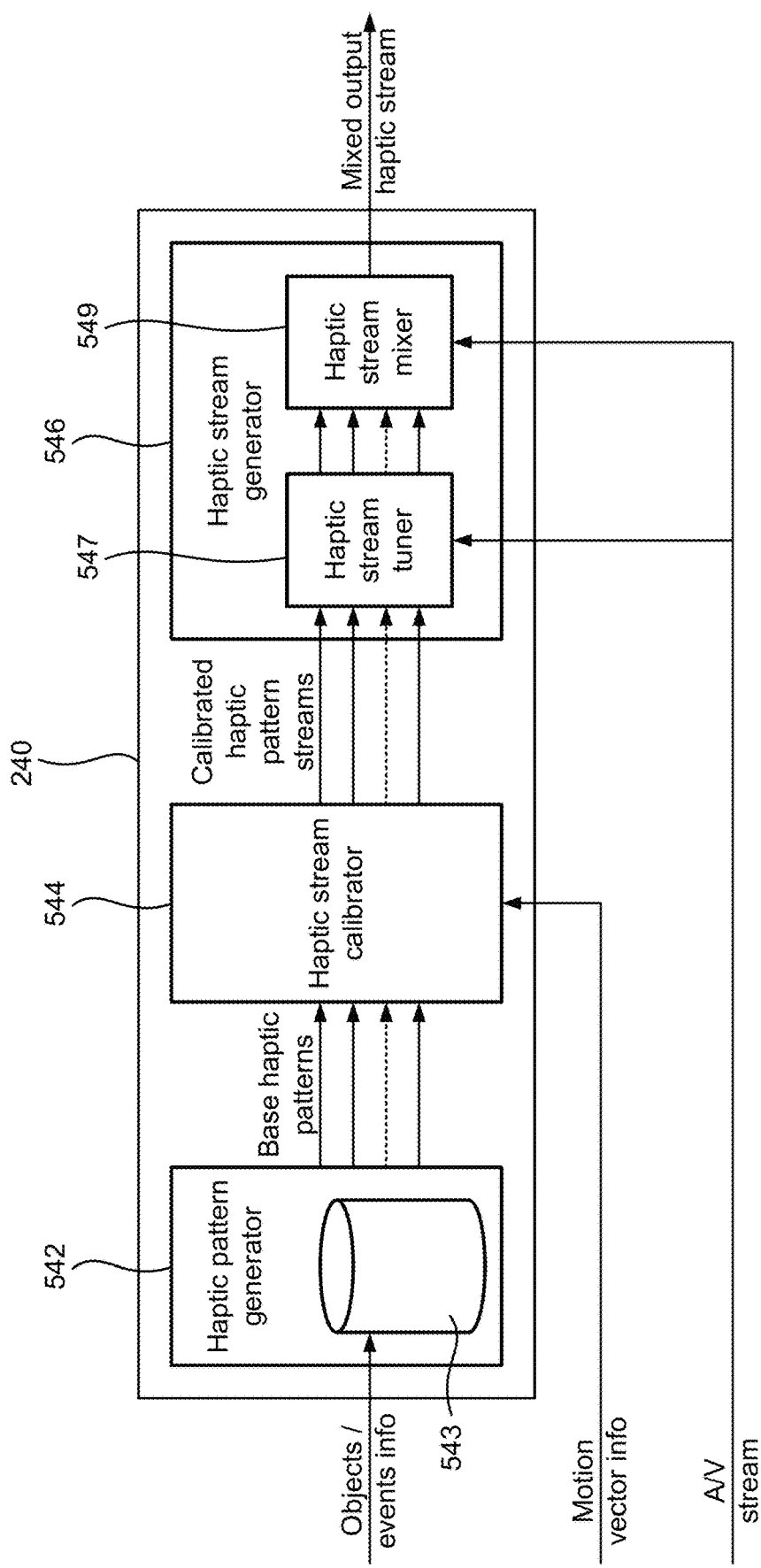
FIG. 5 illustrates an example implementation of a haptic generator in accordance with one or more aspects of the disclosure.

FIG. 5 illustrates an example implementation of the haptic generator 240 in accordance with one or more aspects of the disclosure. The haptic generator 240 may comprise a haptic pattern generator 542, a haptic stream calibrator 544, and a haptic stream generator 546. The haptic pattern generator 542, the haptic stream calibrator 544, and/or the haptic stream generator 546 may be implemented in hardware or in a combination of hardware and software.

The haptic pattern generator 542 may be configured to generate one or more base haptic patterns corresponding to the one or more objects/events within the AV stream based the one or more object/event types in the objects/events information. A base haptic pattern of an object/event type may include haptic characteristics that are particular to that object/event type. For example, for the first object/event 321 and the second object/event 322, the haptic pattern generator 542 may generate a base truck haptic pattern and a base thunder haptic pattern. Each base haptic pattern may have a wave of a particular frequency or combination of frequencies, a particular wave shape, etc.

In an aspect, the haptic generator 240 may comprise a haptic pattern database 543 that includes a plurality of base haptic patterns. For example, the haptic pattern database 543 may be implemented in the memory 160. The haptic pattern generator 542 may choose the one or more base haptic patterns from the haptic pattern database 543 based on the one or more object/event types in the objects/events information. In an aspect, each base haptic pattern may correspond to a particular object/event in the objects/events information.

The haptic stream calibrator 544 may be configured to calibrate the one or more base haptic patterns into one or more calibrated haptic pattern streams. The one or more base haptic patterns may be calibrated based on the motion vector information. For example, regarding the first object/event 321, if the motion vector information indicates that the truck is moving closer to (or further away from) the AV recording device (i.e., device being used to capture the AV stream), then an intensity (e.g., amplitude) of the base truck haptic pattern may be increased (or decreased) accordingly to correlate with the distance of the truck from the AV recording device.

In an aspect, the calibration may be on a per object/event basis. It is indicated above that each base haptic pattern may correspond to a particular object/event. Note that the objects/events identifier 220 may detect multiple objects/events of the same type. For example, there may be two trucks identified (not shown). Thus, the haptic pattern generator 542 may generate two base truck haptic patterns. However, the motion vector information may indicate that a first truck is relatively close and a second truck is relatively far. In this instance, the haptic stream calibrator 544 may intensify the first base truck haptic pattern (corresponding to the first truck) and may abate or otherwise moderate the second base truck haptic pattern (corresponding to the second truck). The one or more calibrated haptic pattern streams may correspond to the one or more objects/events.

The haptic stream generator 546 may be configured to generate the haptic stream from the one or more calibrated haptic pattern streams. In an aspect, the haptic stream generator 546 may comprise a haptic stream mixer 549 configured to mix the calibrated haptic pattern streams based on the audio data of the AV stream. For example, the haptic stream mixer 549 may determine a mixing ratio of the calibrated haptic pattern streams based on the audio data, and mix the calibrated haptic pattern streams accordingly to generate the haptic stream.

In another aspect, the haptic stream generator 546 may also comprise a haptic stream tuner 547 configured to tune the one or more calibrated haptic pattern streams based on the audio data of the AV stream. Thus, the calibrated haptic pattern streams may be fine-tuned. For example, for a calibrated haptic pattern stream, fine tuning may involve tuning or modifying an amplitude, a frequency, a transience, or any combination thereof of the calibrated haptic pattern stream. The tuned haptic pattern streams may then be mixed by the haptic stream mixer 549.

An example of modifying the transience of a calibrated haptic pattern stream is as follows. The audio data may indicate that a sound of a truck is recorded before the truck itself is visually recorded. In this instance, the haptic stream tuner 547 may modify the calibrated haptic pattern stream corresponding to the first object/event 321 to start earlier in time, e.g., also before the truck comes into view. The intensity of the corresponding calibrated haptic pattern stream may also be adjusted, e.g., to correlate with the volume of the recorded truck sound.

Referring back to FIGS. 2A, 2B, the encoder 250 may be configured to encode the AV stream (from the camera service 215A or the post processing service 215B) and the haptic stream (from the haptic generator 240) as a coordinated AVH stream. The encoder 250 may be implemented in hardware or in a combination of hardware and software. The encoder 250 may be configured to save the encoded AVH stream in a single AVH file. Alternatively or in addition thereto, the encoder 250 may be configured to save the encoded AVH stream as an AV file and an associated H file. In system 200B of FIG. 2B, if the H file is generated, then the system may simply include information to indicate that the generated H file is associated with the already recorded AV file.

Figure 6:
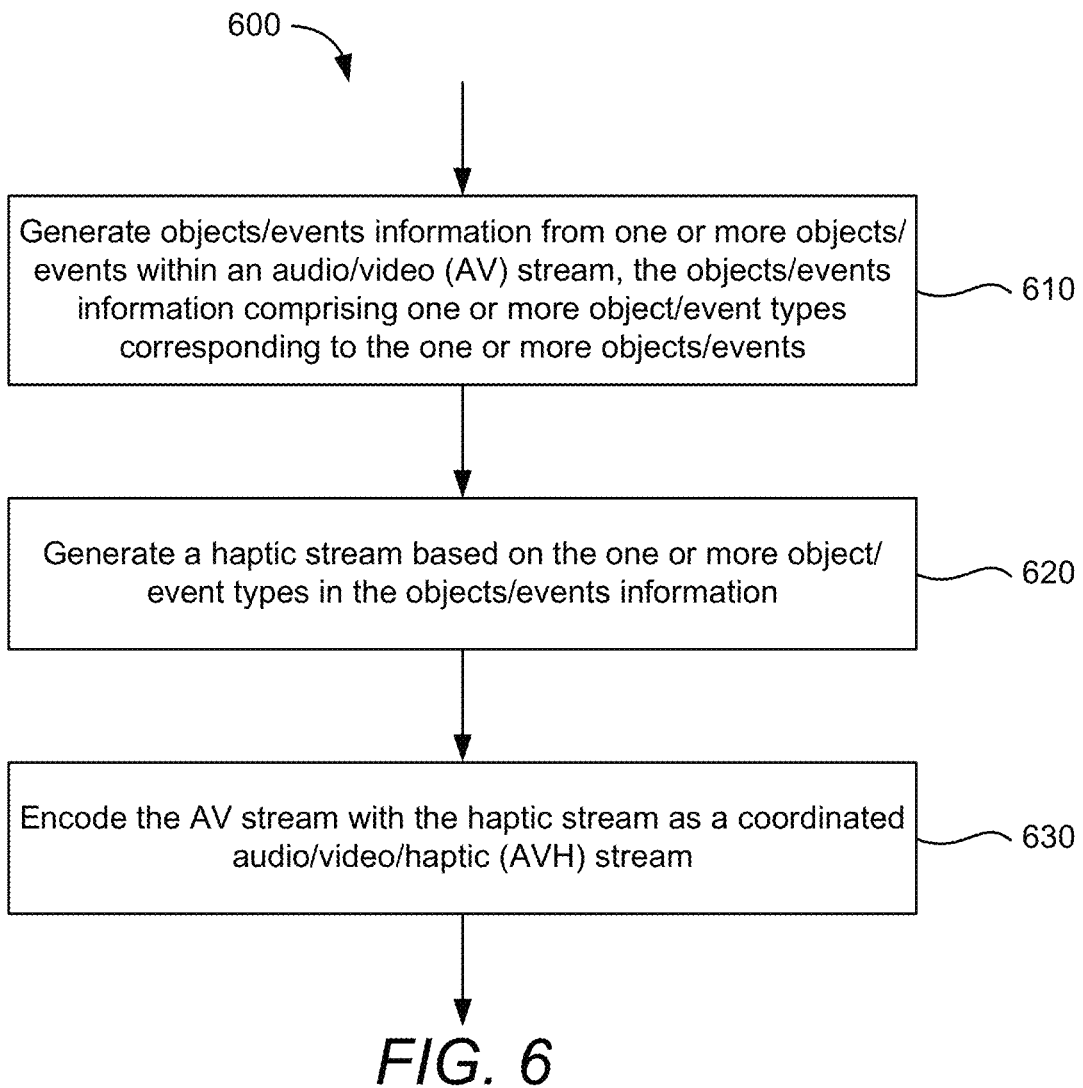

FIG. 6 illustrates a flow chart of an example method 600 of recording haptics in accordance with at one or more aspects of the disclosure. The illustrated method 600 may be performed by a haptic recording device of FIGS. 1, 2A, 2B, 4 and 5 described above. In an aspect, the memory 160 may be an example of a non-transitory computer readable medium storing executable instructions for the haptic recording device (e.g., haptic recording device 270) to perform the method 600.

In block 610, the haptic recording device (e.g., through the objects/events identifier 220) may generate objects/events information from one or more objects/events within an audio/video (AV) stream. The objects/events information may comprise one or more object/event types corresponding to the one or more objects/events. The AV stream may be a live AV stream data 205A (e.g., live capture processing) or AV stream data read from an AV file 205B (e.g., off-line post processing).

Figure 7:
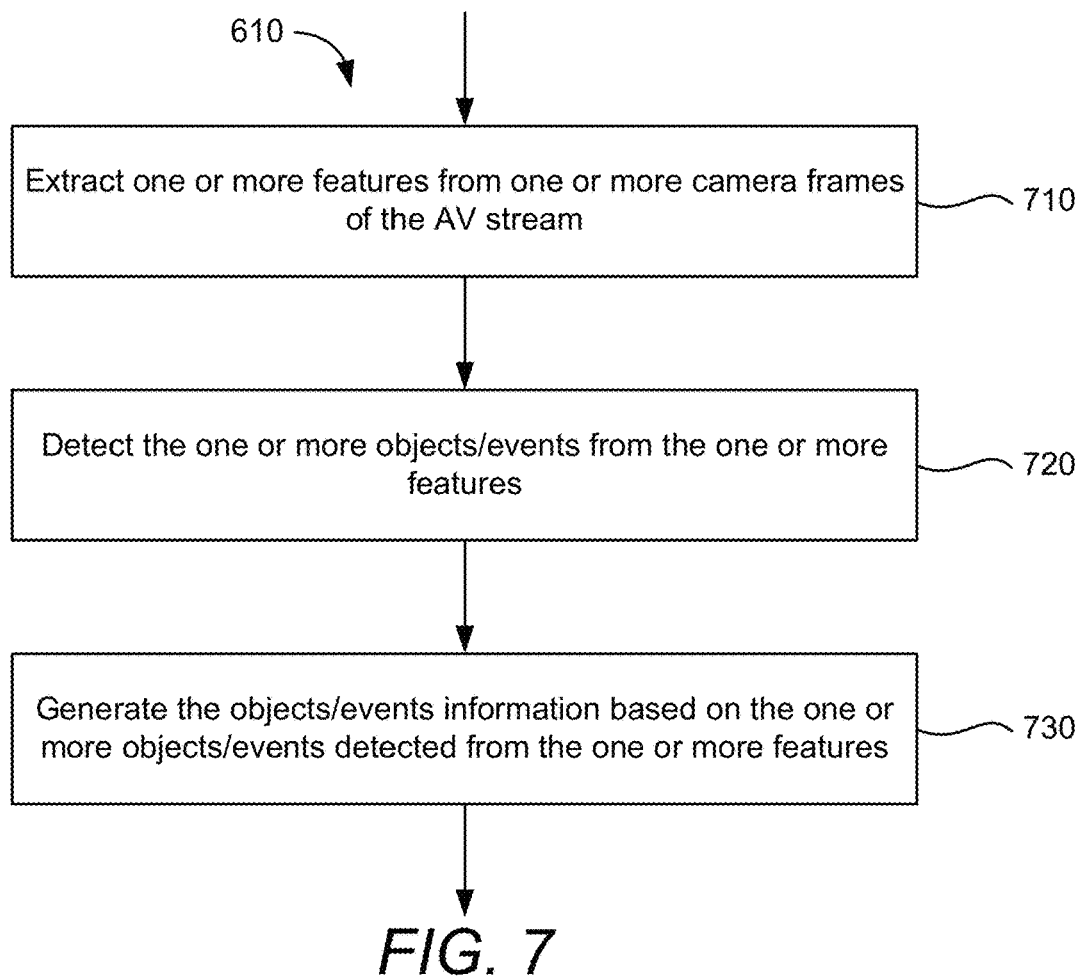

FIG. 7 illustrates a flow chart of an example process that may be performed by the haptic recording device to implement block 610. In an aspect, the memory 160 may be an example of a non-transitory computer readable medium storing executable instructions for the haptic recording device to perform the process of FIG. 7.

In block 710, the haptic recording device (e.g., through the feature extractor 422) may extract one or more features from one or more video frames of the AV stream.

In block 720, the haptic recording device (e.g., through the objects/events detector 424) may detect the one or more objects/events from the one or more features.

Figure 8:
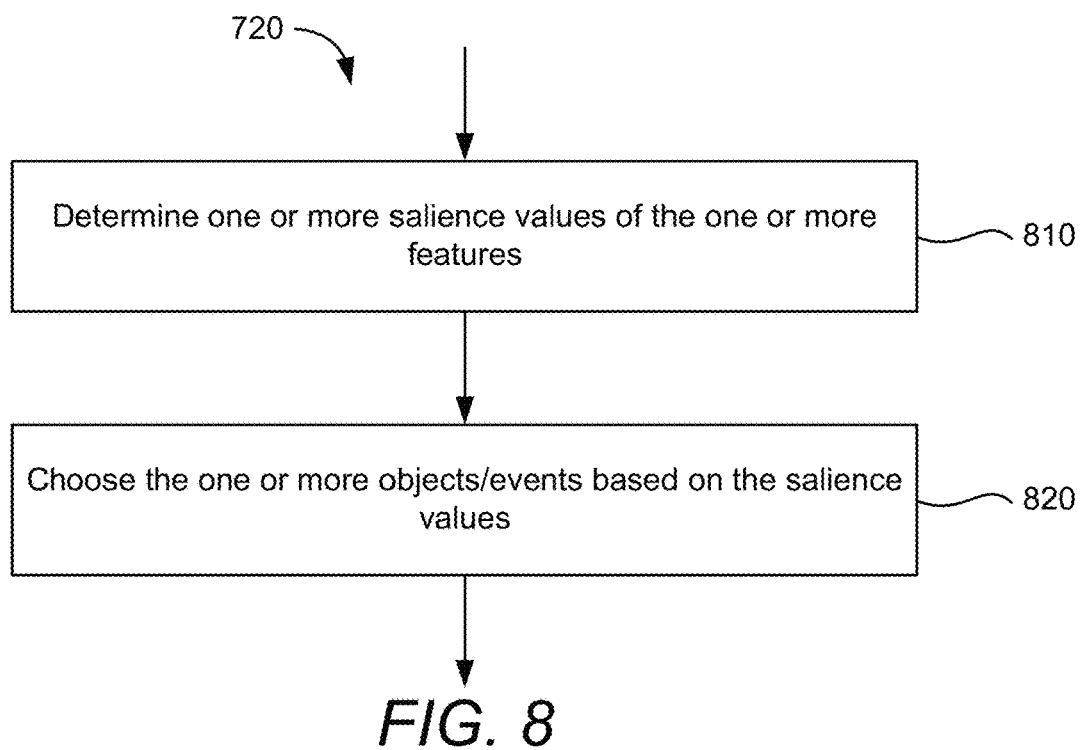

FIG. 8 illustrates a flow chart of an example process that may be performed by the haptic recording device to implement block 720. In an aspect, the memory 160 may be an example of a non-transitory computer readable medium storing executable instructions for the haptic recording device to perform the process of FIG. 8.

In block 810, the haptic recording device (e.g., through the objects/events detector 424) may determine one or more salience values of the one or more features. In an aspect, for at least one extracted feature, a salience value of the extracted feature may be determined based on a size, a frequency, a distance, audio intensity, or any combination thereof of the extracted feature.

In block 820, the haptic recording device (e.g., through the objects/events detector 424) may choose (820) the one or more objects/events based on the one or more salience values Referring back to FIG. 7, in block 730, haptic recording device (e.g., through the objects/events detector 424) may generate the objects/events information based on the one or more objects/events detected from the one or more extracted features.

Referring back to FIG. 6, in block 620, the haptic recording device (e.g., through the haptic generator 240) may generate a haptic stream based on the one or more object/event types in the objects/events information.

Figure 9:
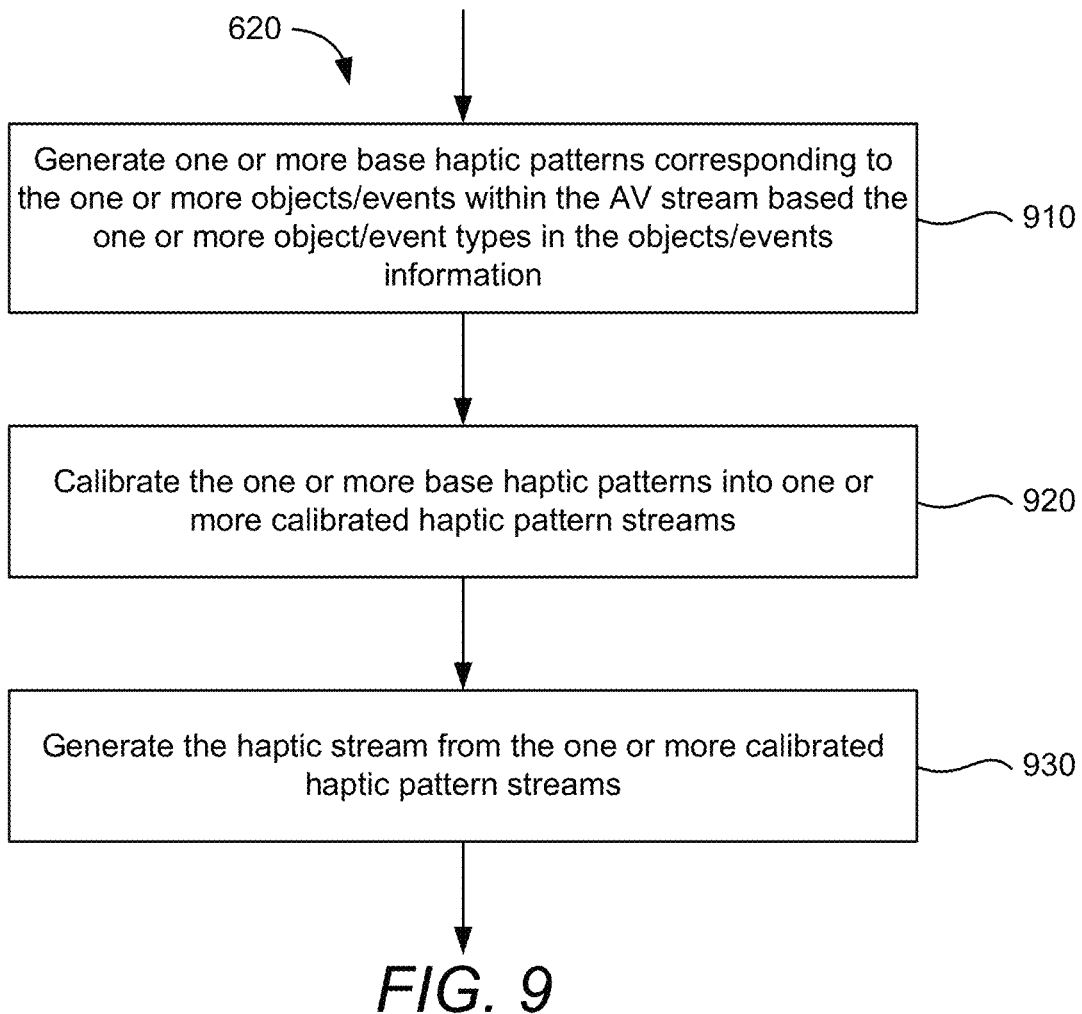

FIG. 9 illustrates a flow chart of an example process that may be performed by the haptic recording device to implement block 620. In an aspect, the memory 160 may be an example of a non-transitory computer readable medium storing executable instructions for the haptic recording device to perform the process of FIG. 9.

In block 910, the haptic recording device (e.g., through the haptic pattern generator 542) may generate one or more base haptic patterns corresponding to the one or more objects/events within the AV stream based the one or more object/event types in the objects/events information.

Figure 10:
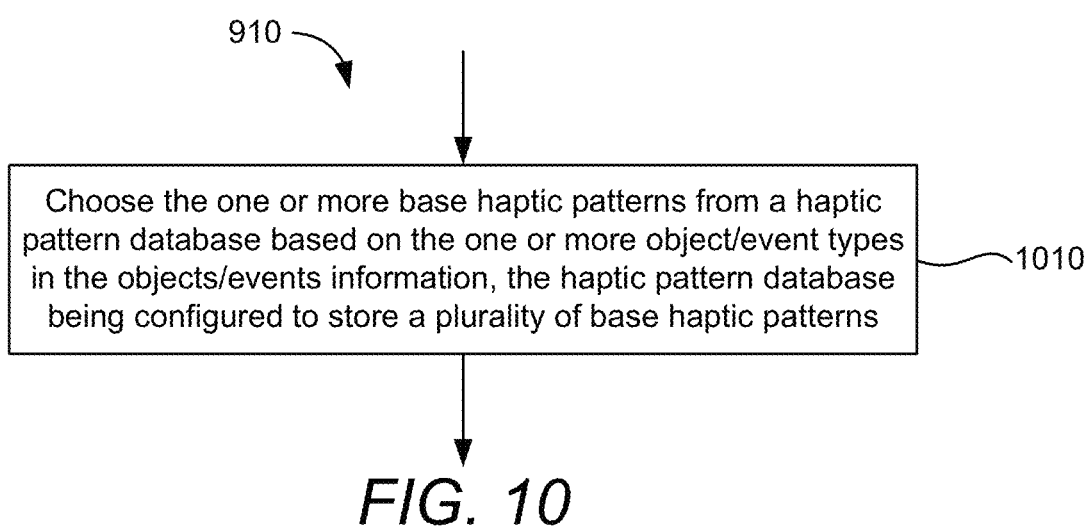

FIG. 10 illustrates a flow chart of an example process that may be performed by the haptic recording device to implement block 910. In an aspect, the memory 160 may be an example of a non-transitory computer readable medium storing executable instructions for the haptic recording device to perform the process of FIG. 10.

In block 1010, the haptic recording device (e.g., through the haptic pattern generator 542) may choose the one or more base haptic patterns from a haptic pattern database 543 based on the one or more object/event types in the objects/events information. The haptic pattern database 543 may be configured to store a plurality of base haptic patterns.

Referring back to FIG. 9, in block 920, the haptic recording device (e.g., through the haptic stream calibrator 544) may calibrate the one or more base haptic patterns into one or more calibrated haptic pattern streams.

FIG. 11 illustrates a flow chart of an example process that may be performed by the haptic recording device to implement block 920. In an aspect, the memory 160 may be an example of a non-transitory computer readable medium storing executable instructions for the haptic recording device to perform the process of FIG. 11.

In block 1110, the haptic recording device (e.g., through the motion vector generator 230) may generate one or more motion vectors corresponding to the one or more objects/events within the AV stream based on the objects/events information.

In block 1120, the haptic recording device (e.g., through the haptic stream calibrator 544) may calibrate the one or more base haptic patterns based on the one or more motion vectors.

Referring back to FIG. 9, in block 930, the haptic recording device (e.g., through the haptic stream generator 546) may generate (930) the haptic stream from the one or more calibrated haptic pattern streams.

FIG. 12 illustrates a flow chart of an example process that may be performed by the haptic recording device to implement block 930. In an aspect, the memory 160 may be an example of a non-transitory computer readable medium storing executable instructions for the haptic recording device to perform the process of FIG. 12.

In block 1210, the haptic recording device (e.g., through the haptic stream mixer 549) may determine a mixing ratio of the one or more calibrated haptic pattern streams. In an aspect, the mixing ratio may be determined based on audio data of the AV stream.

In block 1220, the haptic recording device (e.g., through the haptic stream mixer 549) may generate the haptic stream by mixing the one or more calibrated haptic pattern streams according to the mixing ratio.

In an aspect, prior to block 1210, the haptic recording device (e.g., through the haptic stream tuner 547) in block 1205 may tune any combination of an amplitude, a frequency, and a transience of at least one calibrated haptic pattern stream of the one or more calibrated haptic pattern streams based on audio data of the AV stream. The tuned and calibrated haptic pattern stream may be mixed in blocks 1210 and 1220.

Referring back to FIG. 6, in block 630, the haptic recording device (e.g., through the encoder 250) may encode the AV stream with the haptic stream as a coordinated audio/video/haptic (AVH) stream. In an aspect, the encoded AVH stream may be saved as a single AVH file. Alternatively or in addition thereto, the encoded AVH stream may be saved as an AV file and an associated haptic (H) file.

It should be noted that not all illustrated blocks of FIGS. 6-12 need to be performed, i.e., some blocks may be optional. Also, the numerical references to the blocks in FIGS. 6-12 should not be taken as requiring that the blocks should be performed in a certain order unless specifically indicated otherwise. Indeed, some blocks may be performed concurrently.

Figure 13:
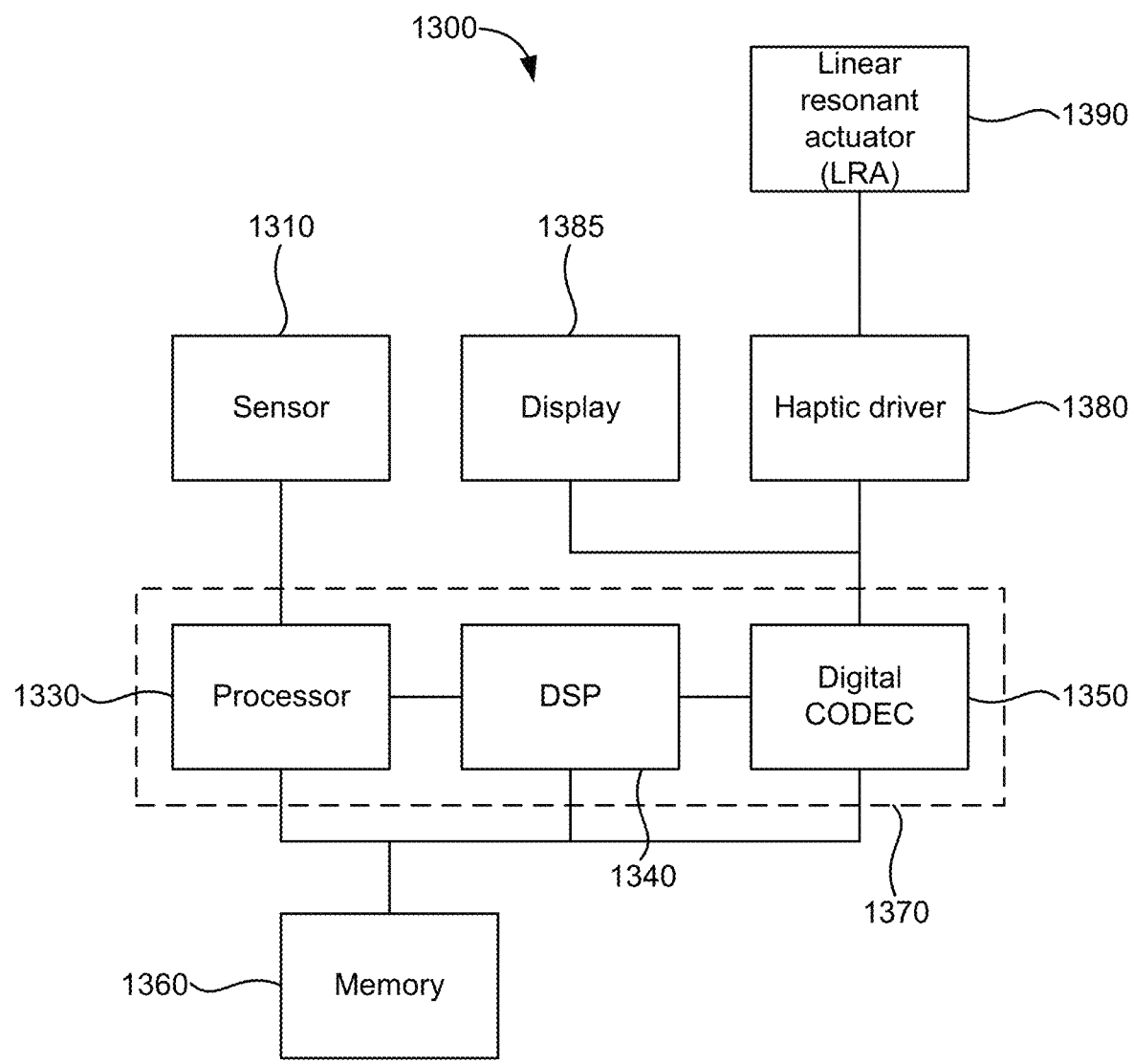
FIG. 13 illustrates an example architecture of a device configured to playback haptics in accordance with at one or more aspects of the disclosure.

FIG. 13 illustrates an example architecture of a device 1300 configured to playback haptics in accordance with at one or more aspects of the disclosure. The device 1300 may be a mobile device, such as a smart phone. As seen, the device 1300 may include a sensor 1310, a processor 1330, a DSP 1340, a digital CODEC 1350, a memory 1360, a display 1385, a haptic driver 1380, and a haptic actuator 1390 (e.g., a linear resonant actuator (LRA)). Each of the sensor 1310, the processor 1330, the DSP 1340, the digital CODEC 1350, the display 1385, the haptic driver 1380, and the haptic actuator 1390 may be implemented as hardware or as a combination of hardware and software (e.g., stored in memory 1360).

FIG. 13 as shown illustrates one example architecture in which the processor 1330, the DSP 1340 and the digital CODEC 1350 may be integrated into one integrated circuit 1370. An alternative architecture (not shown) may be one in which the DSP 1340, the digital CODEC 1350 and the memory 1360 (which may be an embedded memory) are integrated into one integrated circuit, while the processor 1330 may be separate and may interface with the memory 1360.

Figure 14:
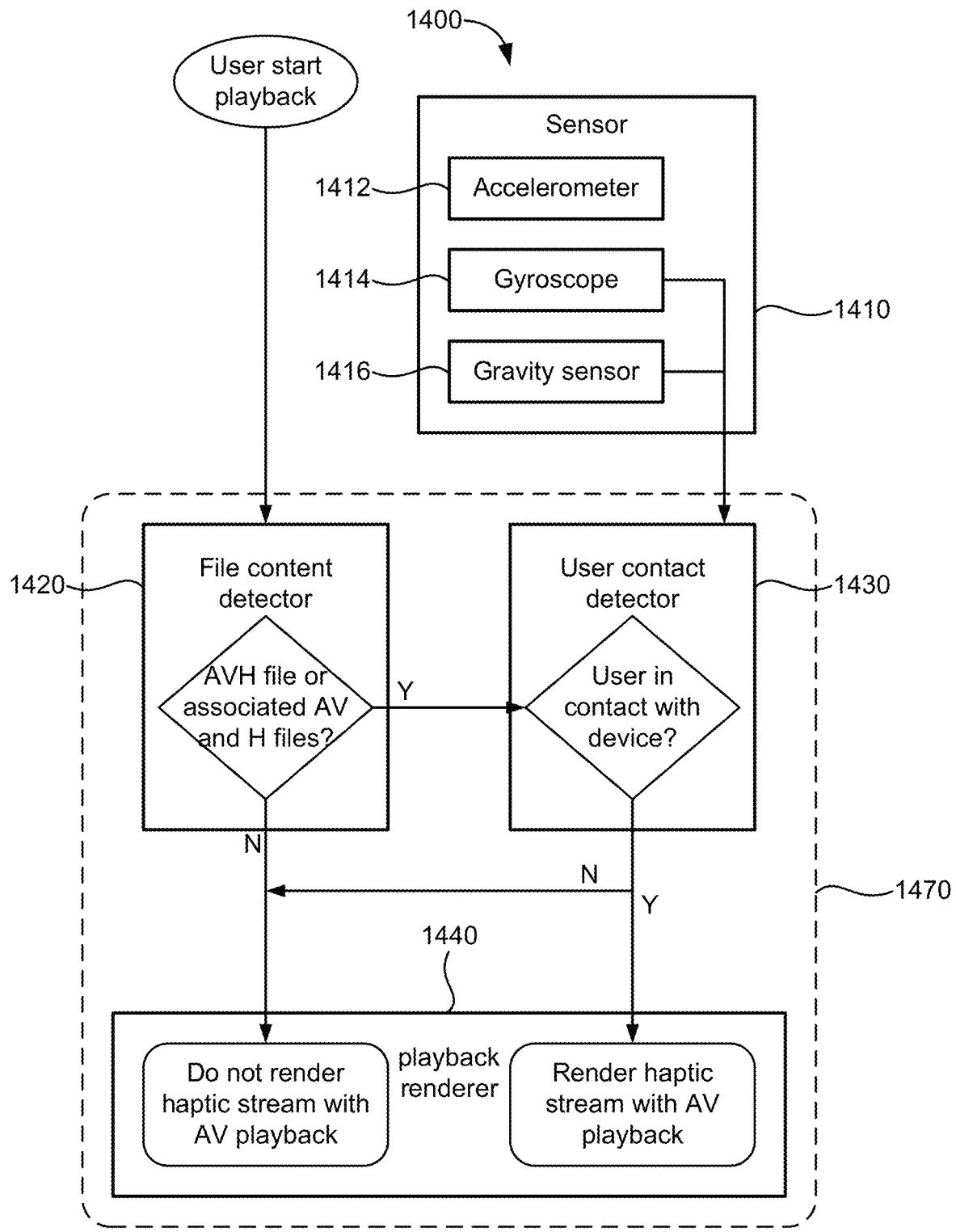
FIG. 14 illustrates an example of a system for playback of haptics in accordance with one or more aspects of the disclosure.

FIG. 14 illustrates an example of a system 1400 for playback of haptics in accordance with one or more aspects of the disclosure. The device 1300 of FIG. 13 may be an example of the system 1400. The system 1400 may comprise a sensor 1410 and a haptic playback device 1470.

The haptic playback device 1470 may comprise a file content detector 1420, a user contact detector 1430 and a playback renderer 1440. In general, the flow of system 1400 may be as follows:

(A) The user may initiate playback of an AVH stream in a device (e.g., mobile phone).
(B) The file content detector 1420 may determine whether the requested stream is included in a single AVH file or in associated AV and H files.

(C) If so, the user contact detector 1430 may determine whether the user is in physical contact with the haptic playback device 1470.

(D) If the user is in physical contact, the playback renderer may render the haptic stream with the AV playback.

(E) If the haptic content is not available (e.g., requested stream is not included in a single AVH file and is not in associated AV and H files) or the user is not in physical contact, the playback renderer may render the AV stream but not the H stream.

In an aspect, the file content detector 1420 may be configured to detect whether a haptic stream corresponding to an AV stream for playback is available. The file content detector 1420 may be implemented in hardware or in a combination of hardware and software. The haptic stream may be determined to be available when the AV stream is from an AVH file. Alternatively, the haptic stream may be determined to be available when the AV stream is from an AV file that is associated with a haptic file.

In an aspect, the user contact detector 1430 may be configured to detect whether a user is in physical contact with the haptic playback device 1470. The user contact detector 1430 may be implemented in hardware or in a combination of hardware and software. The user contact detector 1430 may detect whether the user is in physical contact with the haptic playback device 1470 based on information from a sensor 1410. The sensor 1410 may comprise an accelerometer 1412, a gyroscope 1414, a gravity sensor 1416, or any combination thereof.

In an aspect, the playback renderer 1440 may be configured to render the haptic stream with the AV stream for playback when the file content detector 1420 detects that the haptic stream is available and when the user contact detector 1430 detects that the user is in physical contact with the haptic playback device 1470. The playback renderer 1440 may be implemented in hardware or in a combination of hardware and software. The rendered AV stream may be displayed on the display 1385. The rendered H stream may be provided to the haptic driver 1380, which in turn may drive the haptic actuator 1390 (e.g., LRA) accordingly.

On the other hand, if the file content detector 1420 does not that the haptic stream is available or the user contact detector 1430 does not detect that the user is in physical contact, the playback renderer 1440 may render the AV stream for playback (e.g., on the display 1385) without rendering the haptic stream.

Figure 15:
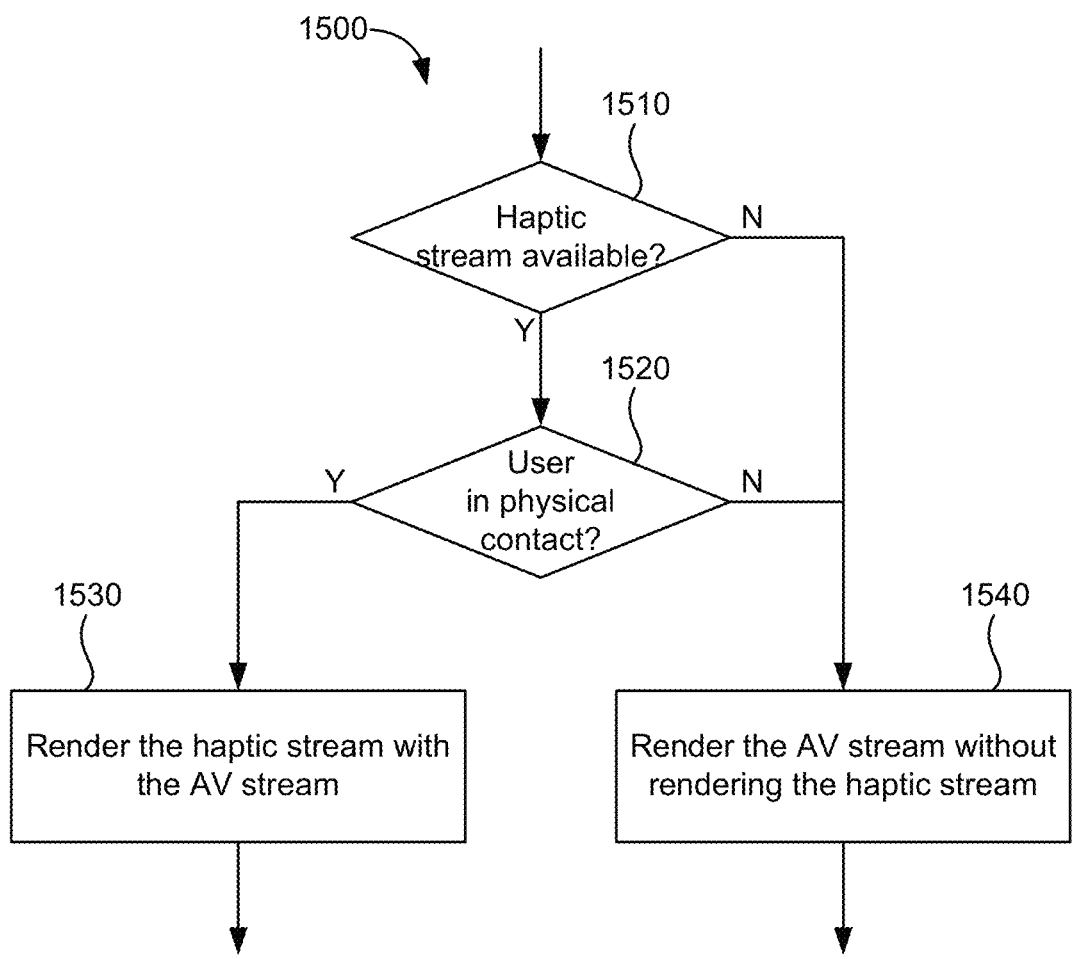
FIGS. 15-16 illustrate flow charts of an example method of playing back haptics in accordance with at one or more aspects of the disclosure.

FIG. 15 illustrates a flow chart of an example method 1500 of playback of haptics in accordance with at one or more aspects of the disclosure. The illustrated method 1500 may be performed by a haptic playback device of FIGS. 13 and 14. In an aspect, the memory 1360 may be an example of a non-transitory computer readable medium storing executable instructions for the haptic playback device (e.g., haptic playback device 1470) to perform the method 1500.

In block 1510, the haptic playback device (e.g., through the file content detector 1420) may determine whether a haptic stream corresponding to an AV stream for playback is available.

Figure 16:
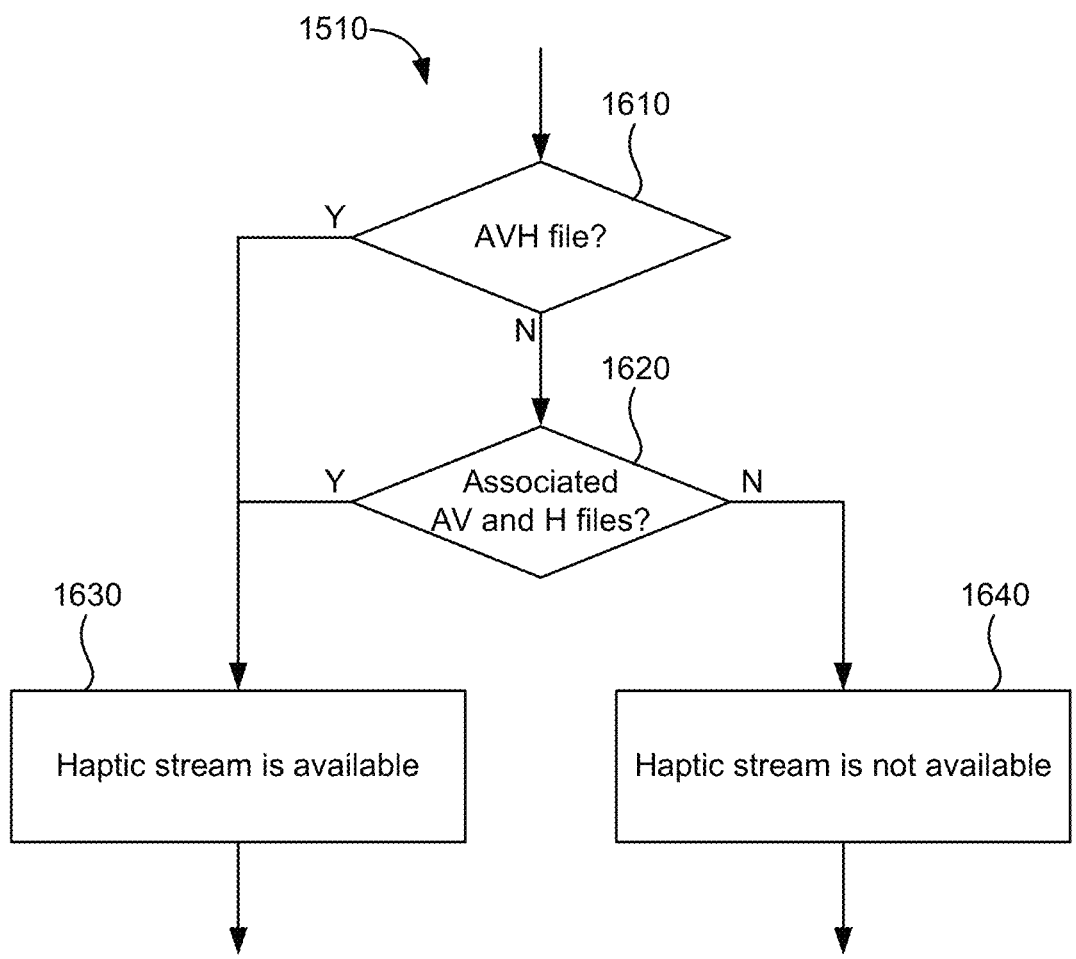

FIG. 16 illustrates a flow chart of an example process that may be performed by the haptic playback device to implement block 1510. In an aspect, the memory 1360 may be an example of a non-transitory computer readable medium storing executable instructions for the haptic playback device to perform the process of FIG. 16.

In block 1610, the haptic playback device (e.g., through the file content detector 1420) may determine whether the AV stream is in an AVH file.

If the AV stream is in the AVH file ("Y" branch from block 1610), then in block 1630, the haptic playback device (e.g., through the file content detector 1420) may determine that the haptic stream is available.

If the AV stream is not in the AVH file ("N" branch from block 1610), then in block 1620, the haptic playback device (e.g., through the file content detector 1420) may determine whether the AV stream is in an AV file associated with a H file.

If there is H file associated with the AV stream ("Y" branch from block 1620), then in block 1630, the haptic playback device (e.g., through the file content detector 1420) may determine that the haptic stream is available.

If there is no associated H file ("N" branch from block 1620), then in block 1640, the haptic playback device (e.g., through the file content detector 1420) may determine that the haptic stream is not available.

Referring back to FIG. 15, in block 1520, the haptic playback device (e.g., through the user contact detector 1430) may determine whether a user is in physical contact with the haptic playback device. In an aspect, whether or not the user is in physical contact may be determined based on information from a sensor (e.g., sensor 1310, 1410), which may comprise an accelerometer 1412, a gyroscope 1414, a gravity sensor 1416, or any combination thereof.

If it is determined that the haptic stream is available and it is also determined that the user is in physical contact ("Y" branch from block 1530), then in block 1530, the haptic playback device (e.g., through the user contact detector 1430) may render the haptic stream with the AV stream for playback.

On the other hand, if it is determined that the haptic stream is not available ("N" branch from block 1510) or it is determined that the user is not in physical contact ("N" branch from block 1520), then in block 1540, the haptic playback device (e.g., through the user contact detector 1430) may render the AV stream for playback without rendering the H stream.

It should be noted that not all illustrated blocks of FIGS. 15 and 16 need to be performed, i.e., some blocks may be optional. Also, the numerical references to the blocks in FIGS. 15 and 16 should not be taken as requiring that the blocks should be performed in a certain order unless specifically indicated otherwise. Indeed, some blocks may be performed concurrently.

Figure 17:
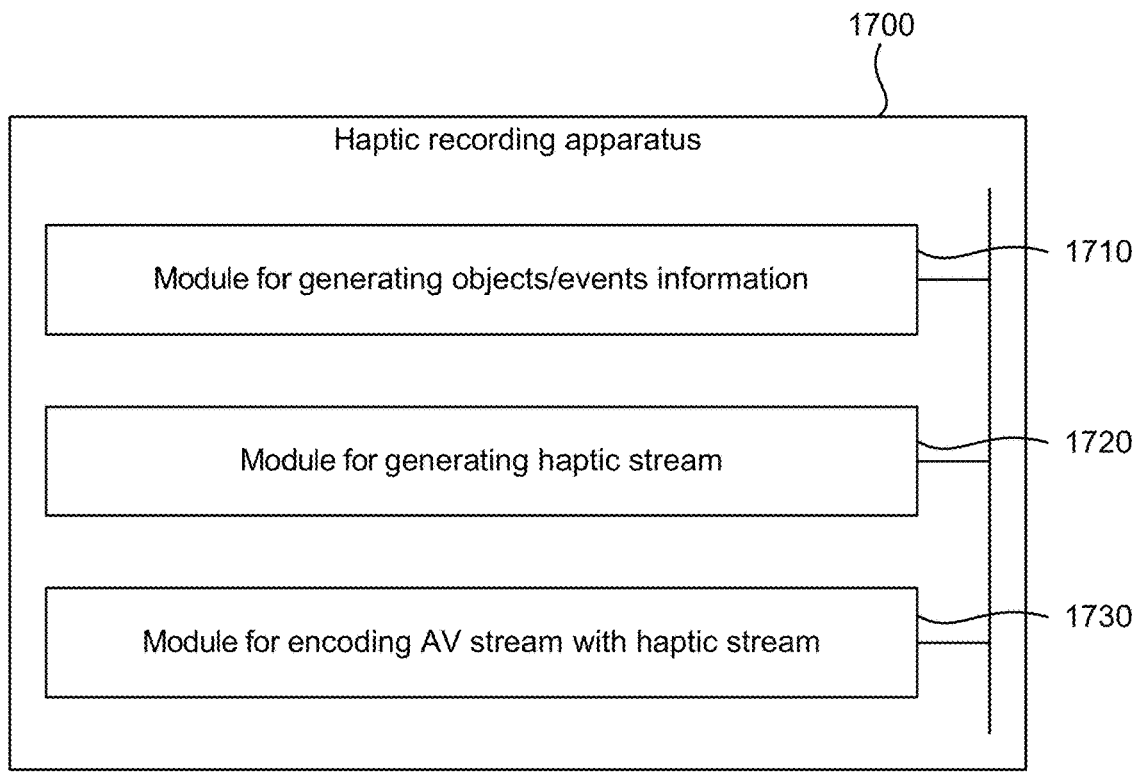
FIG. 17 illustrates a simplified block diagram of several sample aspects of an apparatus configured to record haptics in accordance with one or more aspects of the disclosure.

FIG. 17 illustrates an example of a haptic recording apparatus/device 1700 represented as a series of interrelated functional modules connected by a common bus. Each of the modules may be implemented in hardware or as a combination of hardware and software. For example, the modules may perform the method and processes of FIGS. 6-12, and may be implemented as any combination of the modules of the systems/devices/apparatuses 100, 200A, 200B of FIGS. 1, 2A, 2B, 4 and 5. A module 1710 for generating objects/events information may correspond at least in some aspects to a processor (e.g., processor 130), a DSP (e.g., DSP 140), and/or a memory (e.g., memory 160). The objects/events identifier 220 maybe an example of the module 1710. A module 1720 for generating haptic stream may correspond at least in some aspects to a processor (e.g., processor 130), a DSP (e.g., DSP 140), and/or a memory (e.g., memory 160). The haptic generator 240 may be an example of the module 1720. A module 1730 for encoding AV stream with haptic stream may correspond at least in some aspects to a processor (e.g., processor 130), a DSP (e.g., DSP 140), a CODEC (e.g., digital CODEC 150), and/or a memory (e.g., memory 160). The encoder 250 may be an example of the module 1730.

Figure 18:
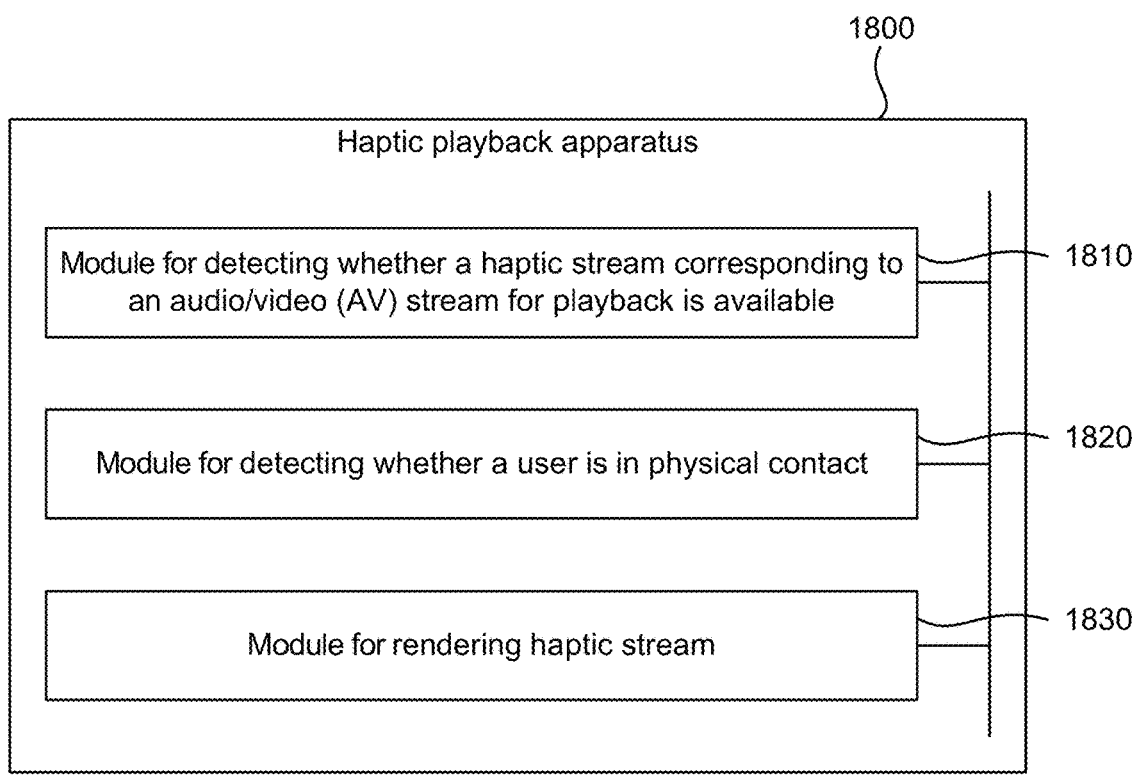
FIG. 18 illustrates a simplified block diagram of several sample aspects of an apparatus configured to playback haptics in accordance with one or more aspects of the disclosure.

FIG. 18 illustrates an example of a haptic playback apparatus/device 1800 represented as a series of interrelated functional modules connected by a common bus. Each of the modules may be implemented in hardware or as a combination of hardware and software. For example, the modules may perform the method and processes of FIGS. 15-16, and may be implemented as any combination of the modules of the systems/devices/apparatuses 1300 and 1400 of FIGS. 13 and 14. A module 1810 for detecting whether a haptic stream for playback is available may correspond at least in some aspects to a processor (e.g., processor 1330), a DSP (e.g., DSP 1340), and/or a memory (e.g., memory 1360). The file content detector 1420 maybe an example of the module 1810. A module 1820 for detecting whether a user is in physical contact may correspond at least in some aspects to a sensor (e.g., sensor 1310), a processor (e.g., processor 1330), a DSP (e.g., DSP 1340), and/or a memory (e.g., memory 1360). The user contact detector 1430 maybe an example of the module 1820. A module 1830 for rendering haptic stream may correspond at least in some aspects to a processor (e.g., processor 1330), a DSP (e.g., DSP 1340), a CODEC (e.g., digital CODEC 150), a haptic driver (e.g., haptic driver 1380), an actuator (e.g., LRA 1390), and/or a memory (e.g., memory 1360). The playback renderer 1440 maybe an example of the module 1830.

Figure 19:
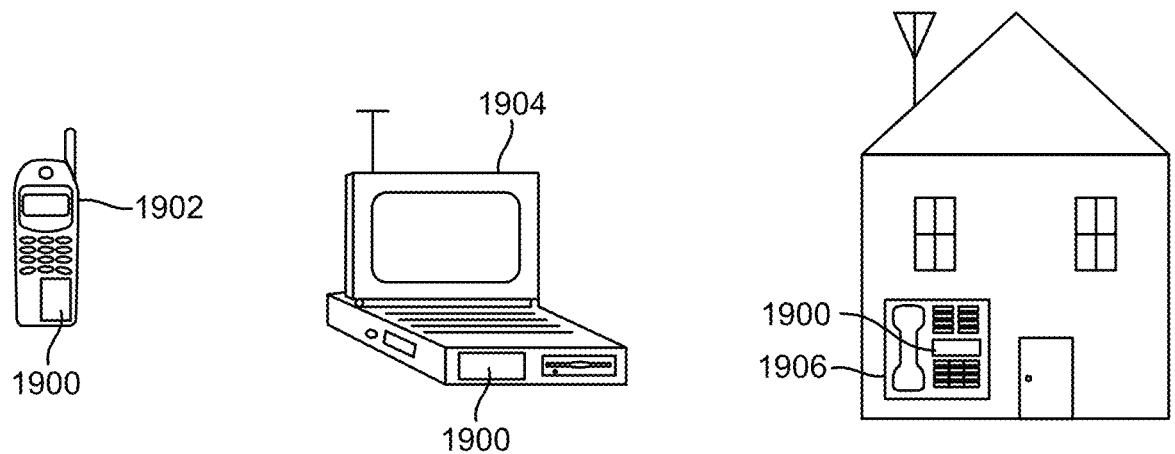
FIG. 19 illustrates various electronic devices which may utilize one or more aspects of the disclosure.

FIG. 19 illustrates various electronic devices which may utilize one or more aspects of the disclosure. For example, a mobile phone device 1902, a laptop computer device 1904, and a terminal device 1906 may include the haptics recording system/device and/or haptics playback system/device 1900. The devices 1902, 1904, 1906 illustrated in FIG. 19 are merely exemplary. Other electronic devices may also include, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), an Internet of things (IoT) device or any other device that stores or retrieves data or computer instructions or any combination thereof.

Implementation examples are described in the following numbered clauses:

Clause 1: A haptic recording device, comprising: an objects/events identifier configured to generate objects/events information from one or more objects/events within an audio/video (AV) stream, the objects/events information comprising one or more object/event types corresponding to the one or more objects/events; a haptic generator configured to generate a haptic stream based on the one or more object/event types in the objects/events information; and an encoder configured to encode the AV stream with the haptic stream as a coordinated audio/video/haptic (AVH) stream.

Clause 2: The haptic recording device of clause 1, wherein the AV stream is live AV stream data.

Clause 3: The haptic recording device of clause 1, wherein the AV stream is AV stream data read from an AV file.

Clause 4: The haptic recording device of any of clauses 1-3, wherein the objects/events identifier comprises: a feature extractor configured to extract one or more features from one or more camera frames of the AV stream; and an objects/events detector configured to detect the one or more objects/events from the one or more features, and generate the objects/events information based on the one or more objects/events detected from the one or more features.

Clause 5: The haptic recording device of clause 4, wherein in detecting the one or more objects/events, the objects/events detector is configured to determine one or more salience values of the one or more features, and choose the one or more objects/events based on the one or more salience values.

Clause 6: The haptic recording device of clause 5, wherein for at least one feature extracted from the one or more camera frames of the AV stream, a salience value of the at least one feature is determined based on a size, a frequency, a distance, audio intensity, or any combination thereof of the at least one feature.

Clause 7: The haptic recording device of any of clauses 1-6, wherein the haptic generator comprises: a haptic pattern generator configured to generate one or more base haptic patterns corresponding to the one or more objects/events within the AV stream based the one or more object/event types in the objects/events information; a haptic stream calibrator configured to calibrate the one or more base haptic patterns into one or more calibrated haptic pattern streams; and a haptic stream generator configured to generate the haptic stream from the one or more calibrated haptic pattern streams.

Clause 8: The haptic recording device of clause 7, wherein the haptic generator further comprises a haptic pattern database configured to store a plurality of base haptic patterns, and wherein in generating the one or more base haptic patterns, the haptic pattern generator is configured to choose the one or more base haptic patterns from the haptic pattern database based on the one or more object/event types in the objects/events information.

Clause 9: The haptic recording device of any of clauses 7-8, further comprising: a motion vector generator configured to generate one or more motion vectors corresponding to the one or more objects/events within the AV stream based on the objects/events information, wherein in calibrating the one or more base haptic patterns, the haptic stream calibrator is configured to calibrate the one or more base haptic patterns based on the one or more motion vectors.

Clause 10: The haptic recording device of any of clauses 7-9, wherein the haptic stream generator comprises: a haptic stream mixer configured to determine a mixing ratio of the one or more calibrated haptic pattern streams, and generate the haptic stream by mixing the one or more calibrated haptic pattern streams according to the mixing ratio.

Clause 11: The haptic recording device of clause 10, wherein in determining the mixing ratio, the haptic stream mixer is configured to determine the mixing ratio based on audio data of the AV stream.

Clause 12: The haptic recording device of any of clauses 10-11, wherein the haptic stream generator further comprises: a haptic stream tuner configured to tune any combination of an amplitude, a frequency, and a transient of at least one calibrated haptic pattern stream of the one or more calibrated haptic pattern streams based on audio data of the AV stream.

Clause 13: The haptic recording device of any of clauses 1-12, wherein the encoder is configured to save the encoded AVH stream as a single AVH file.

Clause 14: The haptic recording device of any of clauses 1-13, wherein the encoder is configured to save the encoded AVH stream as an AV file and an associated haptic (H) file.

Clause 15: A method of recording haptics, the method comprising: generating objects/events information from one or more objects/events within an audio/video (AV) stream, the objects/events information comprising one or more object/event types corresponding to the one or more objects/events; generating a haptic stream based on the one or more object/event types in the objects/events information; and encoding the AV stream with the haptic stream as a coordinated audio/video/haptic (AVH) stream.

Clause 16: The method of clause 15, wherein the AV stream is live AV stream data.

Clause 17: The method of clause 15, wherein the AV stream is AV stream data read from an AV file.

Clause 18: The method of any of clauses 15-17, wherein generating the objects/events information comprises: extracting one or more features from one or more camera frames of the AV stream; detecting the one or more objects/events from the one or more features; and generating the objects/events information based on the one or more objects/events detected from the one or more features.

Clause 19: The method of clause 18, wherein detecting the one or more objects/events comprises: determining one or more salience values of the one or more features, and choosing the one or more objects/events based on the one or more salience values.

Clause 20: The method of clause 19, wherein for at least one feature extracted from the one or more camera frames of the AV stream, a salience value of the at least one feature is determined based on a size, a frequency, a distance, audio intensity, or any combination thereof of the at least one feature.

Clause 21: The method of any of clauses 15-20, wherein generating the haptic stream comprises: generating one or more base haptic patterns corresponding to the one or more objects/events within the AV stream based the one or more object/event types in the objects/events information; calibrating the one or more base haptic patterns into one or more calibrated haptic pattern streams; and generating the haptic stream from the one or more calibrated haptic pattern streams.

Clause 22: The method of clause 21, wherein in generating the one or more base haptic patterns comprises choosing the one or more base haptic patterns from a haptic pattern database based on the one or more object/event types in the objects/events information, the haptic pattern database being configured to store a plurality of base haptic patterns.

Clause 23: The method of any of clauses 21-22, wherein calibrating the one or more base haptic patterns into the one or more calibrated haptic pattern streams comprises: generating one or more motion vectors corresponding to the one or more objects/events within the AV stream based on the objects/events information; and calibrating the one or more base haptic patterns based on the one or more motion vectors.

Clause 24: The method of any of clauses 21-23, wherein generating the haptic stream comprises: determining a mixing ratio of the one or more calibrated haptic pattern streams; and generating the haptic stream by mixing the one or more calibrated haptic pattern streams according to the mixing ratio.

Clause 25: The method of clause 24, wherein the mixing ratio is determined based on audio data of the AV stream.

Clause 26: The method of any of clauses 24-25, wherein generating the haptic stream further comprises: tuning any combination of an amplitude, a frequency, and a transient of at least one calibrated haptic pattern stream of the one or more calibrated haptic pattern streams based on audio data of the AV stream.

Clause 27: The method of any of clauses 15-26, wherein the encoded AVH stream is saved as a single AVH file.

Clause 28: The method of any of clauses 15-27, wherein the encoded AVH stream is saved as an AV file and an associated haptic (H) file.

Clause 29: A haptic recording device comprising at least one means for performing a method of any of clauses 15-28.

Clause 30: A haptic recording device comprising a memory and a processor communicatively connected to the memory, the processor being configured perform a method of any of clauses 15-28.

Clause 31: A non-transitory computer-readable medium storing code for a haptic recording device comprising a memory and a processor communicatively connected to the memory, and instructions stored in the memory and executable by the processor to cause the haptic recording device to perform a method of any of clauses 15-28.

Clause 32: A haptic playback device, comprising: a file content detector configured to determine whether a haptic stream corresponding to an audio/video (AV) stream for playback is available, the haptic stream being determined to be available when the AV stream is from an audio/video/haptic (AVH) file or is an AV file associated with a haptic (H) file; a user contact detector configured to determine whether a user is in physical contact with the haptic playback device; and a playback renderer configured to render the haptic stream with the AV stream for playback when the file content detector determines that the haptic stream is available and when the user contact detector determines that the user is in physical contact with the haptic playback device.

Clause 33: The haptic playback device of clause 32, wherein the user contact detector is configured to determine whether the user is in physical contact with the haptic playback device based on information from a sensor.

Clause 34: The haptic playback device of clause 33, wherein the sensor comprises an accelerometer, a gyroscope, a gravity sensor, or any combination thereof.

Clause 35: The haptic playback device of any of clauses 32-34, wherein the playback renderer is configured to render the AV stream for playback without rendering the haptic stream when the file content detector determines that the haptic stream is not available or when the user contact detector determines that the user is not in physical contact with the haptic playback device.

Clause 36: A method of haptic playback, the method comprising: determining whether a haptic stream corresponding to an audio/video (AV) stream for playback is available, the haptic stream being determined to be available when the AV stream is from an audio/video/haptic (AVH) file or is an AV file associated with a haptic (H) file; determining whether a user is in physical contact with the haptic playback device; and rendering the haptic stream with the AV stream for playback when it is determined that the haptic stream corresponding to the AV stream for playback is available and when it is determined that the user is in physical contact with the haptic playback device.

Clause 37: The method of clause 36, wherein determining whether the user is in physical contact comprises determining whether the user is in physical contact with the haptic playback device based on information from a sensor.

Clause 38: The method of clause 37, wherein the sensor comprises an accelerometer, a gyroscope, a gravity sensor, or any combination thereof.

Clause 39: The method of any of clauses 36-38, further comprising: rendering the AV stream for playback without rendering the haptic stream when it is determined that the haptic stream is not available or when it is determined that the user is not in physical contact with the haptic playback device.

Clause 40: A haptic playback device comprising at least one means for performing a method of any of clauses 36-39.

Clause 41: A haptic playback device comprising a memory and a processor communicatively connected to the memory, the processor being configured perform a method of any of clauses 36-39.

Clause 42: A non-transitory computer-readable medium storing code for a haptic playback device comprising a memory and a processor communicatively connected to the memory, and instructions stored in the memory and executable by the processor to cause the haptic playback device to perform a method of any of clauses 36-39.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described herein can be configured to perform at least a portion of a method described herein.

It should be noted that the terms "connected," "coupled," or any variant thereof, mean any connection or coupling, either direct or indirect, between elements, and can encompass a presence of an intermediate element between two elements that are "connected" or "coupled" together via the intermediate element unless the connection is expressly disclosed as being directly connected.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Nothing stated or illustrated depicted in this application is intended to dedicate any component, action, feature, benefit, advantage, or equivalent to the public, regardless of whether the component, action, feature, benefit, advantage, or the equivalent is recited in the claims.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or one or more claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions and/or functionalities of the methods disclosed.

Furthermore, in some examples, an individual action can be subdivided into one or more sub-actions or contain one or more sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A haptic recording device, comprising:
   an objects/events identifier configured to generate objects/events information from one or more objects/events within an audio/video (AV) stream, the objects/events information comprising one or more object/event types corresponding to the one or more objects/events;
   a haptic generator configured to generate a haptic stream based on the one or more object/event types in the objects/events information, wherein the haptic generator comprises: i) a haptic pattern database configured to store a plurality of base haptic patterns, ii) a haptic pattern generator configured to generate a plurality of base haptic patterns based on the plurality of one or more object/event types in the objects/events information by choosing a plurality of base haptic patterns from the haptic pattern database based on the one or more object/event types in the objects/events information, iii) a haptic stream calibrator configured to calibrate the plurality of base haptic patterns into a plurality of calibrated haptic pattern streams, wherein calibrating a base haptic pattern into a calibrated haptic pattern stream comprises modulating the base haptic pattern based on motion vector information or audio stream data from the AV stream, and iv) a haptic stream generator configured to generate the haptic stream from the plurality of calibrated haptic pattern streams; and
   an encoder configured to encode the AV stream with the haptic stream as a coordinated audio/video/haptic (AVH) stream.

2. The haptic recording device of claim 1, wherein the AV stream is live AV stream data.

3. The haptic recording device of claim 1, wherein the AV stream is AV stream data read from an AV file.

4. The haptic recording device of claim 1, wherein the objects/events identifier comprises:
   a feature extractor configured to extract one or more features from one or more video frames of the AV stream; and
   an objects/events detector configured to
      detect the one or more objects/events from the one or more features, and
      generate the objects/events information based on the one or more objects/events detected from the one or more features.

5. The haptic recording device of claim 4, wherein in detecting the one or more objects/events, the objects/events detector is configured to
   determine one or more salience values of the one or more features, and
   choose the one or more objects/events based on the one or more salience values.

6. The haptic recording device of claim 5, wherein for at least one feature extracted from the one or more video frames of the AV stream, a salience value of the at least one feature is determined based on a size, a frequency, a distance, audio intensity, or any combination thereof of the at least one feature.

7. The haptic recording device of claim 1, further comprising:
   a motion vector generator configured to generate one or more motion vectors corresponding to the one or more objects/events within the AV stream based on the objects/events information,
   wherein in calibrating the one or more base haptic patterns, the haptic stream calibrator is configured to calibrate the one or more base haptic patterns based on the one or more motion vectors.

8. The haptic recording device of claim 1, wherein the haptic stream generator comprises:
   a haptic stream mixer configured to
      determine a mixing ratio of the one or more calibrated haptic pattern streams based on audio data of the AV stream, and
      generate the haptic stream by mixing the one or more calibrated haptic pattern streams according to the mixing ratio.

9. The haptic recording device of claim 8, wherein the haptic stream generator further comprises:
   a haptic stream tuner configured to tune any combination of an amplitude, a frequency, and a transience of at least one calibrated haptic pattern stream of the one or more calibrated haptic pattern streams based on audio data of the AV stream.

10. The haptic recording device of claim 1, wherein the encoder is configured to save the encoded AVH stream as a single AVH file.

11. A method of recording haptics, the method comprising:
    generating objects/events information from one or more objects/events within an audio/video (AV) stream, the objects/events information comprising one or more object/event types corresponding to the one or more objects/events;
    generating a haptic stream based on the one or more object/event types in the objects/events information, wherein the haptic generation comprises: i) utilizing a haptic pattern database configured to store a plurality of base haptic patterns, ii) utilizing a haptic pattern generator configured to generate a plurality of base haptic patterns based on the plurality of one or more object/event types in the objects/events information by choosing a plurality of base haptic patterns from the haptic pattern database based on the one or more object/event types in the objects/events information, iii) utilizing a haptic stream calibrator configured to calibrate the plurality of base haptic patterns into a plurality of calibrated haptic pattern streams, wherein calibrating a base haptic pattern into a calibrated haptic pattern stream comprises modulating the base haptic pattern based on motion vector information or audio stream data from the AV stream, and iv) utilizing a haptic stream generator configured to generate the haptic stream from the plurality of calibrated haptic pattern streams; and
    encoding the AV stream with the haptic stream as a coordinated audio/video/haptic (AVH) stream.

12. The method of claim 11, wherein the AV stream is live AV stream data.

13. The method of claim 11, wherein the AV stream is AV stream data read from an AV file.

14. The method of claim 11, wherein generating the objects/events information comprises:
   extracting one or more features from one or more video frames of the AV stream;
   detecting the one or more objects/events from the one or more features; and
   generating the objects/events information based on the one or more objects/events detected from the one or more features.

15. The method of claim 14, wherein detecting the one or more objects/events comprises:
   determining one or more salience values of the one or more features, and
   choosing the one or more objects/events based on the one or more salience values.

16. The method of claim 15, wherein for at least one feature extracted from the one or more video frames of the AV stream, a salience value of the at least one feature is determined based on a size, a frequency, a distance, audio intensity, or any combination thereof of the at least one feature.

17. The method of claim 11, wherein calibrating the one or more base haptic patterns into the one or more calibrated haptic pattern streams comprises:
   generating one or more motion vectors corresponding to the one or more objects/events within the AV stream based on the objects/events information; and
   calibrating the one or more base haptic patterns based on the one or more motion vectors.

18. The method of claim 11, wherein generating the haptic stream comprises:
   determining a mixing ratio of the one or more calibrated haptic pattern streams based on audio data of the AV stream; and
   generating the haptic stream by mixing the one or more calibrated haptic pattern streams according to the mixing ratio.

19. The method of claim 18, wherein generating the haptic stream further comprises:
   tuning any combination of an amplitude, a frequency, and a transience of at least one calibrated haptic pattern stream of the one or more calibrated haptic pattern streams based on audio data of the AV stream.

20. The method of claim 11, wherein the encoded AVH stream is saved as a single AVH file.

\* \* \* \* \*